(12) United States Patent
Kato

(10) Patent No.: US 12,538,178 B2
(45) Date of Patent: Jan. 27, 2026

(54) COMMUNICATION SYSTEM, COMMUNICATION DEVICE, WIRELESS LINK SELECTION METHOD

(71) Applicant: NEC Corporation, Tokyo (JP)

(72) Inventor: Rintaro Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 348 days.

(21) Appl. No.: 18/278,521

(22) PCT Filed: Feb. 26, 2021

(86) PCT No.: PCT/JP2021/007557
§ 371 (c)(1),
(2) Date: Aug. 23, 2023

(87) PCT Pub. No.: WO2022/180848
PCT Pub. Date: Sep. 1, 2022

(65) Prior Publication Data
US 2024/0056887 A1  Feb. 15, 2024

(51) Int. Cl.
*H04W 28/08* (2023.01)
*H04W 28/20* (2009.01)
*H04W 72/54* (2023.01)

(52) U.S. Cl.
CPC ....... *H04W 28/0958* (2020.05); *H04W 28/20* (2013.01); *H04W 72/54* (2023.01)

(58) Field of Classification Search
CPC . H04W 28/0958; H04W 28/20; H04W 72/02; H04W 72/52; H04W 72/54; H04W 72/541; H04W 72/40; H04W 92/10
See application file for complete search history.

(56) References Cited

U.S. PATENT DOCUMENTS 8,345,588 B2 *  1/2013  Adachi ................ H04W 48/18
                                          455/552.1
8,804,624 B1 *  8/2014  Lee ....................... H04B 1/406
                                          370/328

(Continued)

FOREIGN PATENT DOCUMENTS

JP  2002-186019 A  6/2002
JP  2003-273799 A  9/2003

(Continued)

OTHER PUBLICATIONS

Shrivastava, Vivek, et. al. "PIE in the Sky: Online Passive Interference Estimation for Enterprise WLANs" NSDI '11: 8th Usenix Symposium on Networked Systems Design and Implementation; Boston, MA; Mar. 30-Apr. 1, 2011. (Year: 2011).*

(Continued)

*Primary Examiner* — Stephen J Clawson
(74) *Attorney, Agent, or Firm* — Sughrue Mion, PLLC

(57) ABSTRACT

A communication system including a processor, which acquires a communication-time performance parameter and a non-communication-time performance parameter for each of a first wireless link and a second wireless link, calculates a degree of interference based on the communication-time performance parameter and the non-communication-time performance parameter of the second wireless link, corrects the communication-time performance parameter in accordance with a bandwidth which is identified based on the degree of interference, and selects a wireless link to be used for communication from among the first wireless link and the second wireless link, based on the corrected communication-time performance parameter.

18 Claims, 9 Drawing Sheets

(56) References Cited

U.S. PATENT DOCUMENTS

| | | | |
|---|---|---|---|
| 9,591,499 B2* | 3/2017 | Comsa | H04W 72/541 |
| 11,283,475 B1* | 3/2022 | Tsai | H04W 28/20 |
| 2005/0272434 A1* | 12/2005 | Choi | H04B 1/715 |
| | | | 455/450 |
| 2011/0261861 A1* | 10/2011 | Lee | H04B 1/715 |
| | | | 375/132 |
| 2012/0134390 A1* | 5/2012 | Smadi | H04B 1/715 |
| | | | 375/E1.033 |
| 2012/0207040 A1* | 8/2012 | Comsa | H04W 72/1215 |
| | | | 370/252 |
| 2013/0295950 A1 | 11/2013 | Ruuska et al. | |
| 2013/0303214 A1 | 11/2013 | Ahmadi | |
| 2014/0341108 A1* | 11/2014 | Desai | H04L 5/0073 |
| | | | 370/328 |
| 2015/0172949 A1* | 6/2015 | Lee | H04L 1/20 |
| | | | 370/252 |
| 2015/0249947 A1* | 9/2015 | Zhang | H04L 1/0027 |
| | | | 370/332 |
| 2016/0066215 A1* | 3/2016 | Yang | H04W 28/20 |
| | | | 455/454 |
| 2017/0188363 A1* | 6/2017 | Ellinikos | H04W 72/542 |
| 2021/0029715 A1* | 1/2021 | Takahashi | H04W 76/15 |

FOREIGN PATENT DOCUMENTS

| | | |
|---|---|---|
| JP | 2005-539431 A | 12/2005 |
| JP | 2007-110373 A | 4/2007 |
| JP | 2008-078698 A | 4/2008 |
| JP | 2011-015048 A | 1/2011 |
| JP | 2014-507870 A | 3/2014 |
| JP | 2015-005865 A | 1/2015 |
| JP | 2015-522981 A | 8/2015 |
| JP | 2015-177436 A | 10/2015 |
| JP | 2015-177438 A | 10/2015 |
| JP | 2015-177519 A | 10/2015 |
| JP | 2018-056932 A | 4/2018 |
| WO | 2014/057682 A1 | 4/2014 |

OTHER PUBLICATIONS

International Search Report for PCT Application No. PCT/JP2021/007557, mailed on Apr. 27, 2021.

* cited by examiner

FIG. 7
(BEFORE CORRECTION)
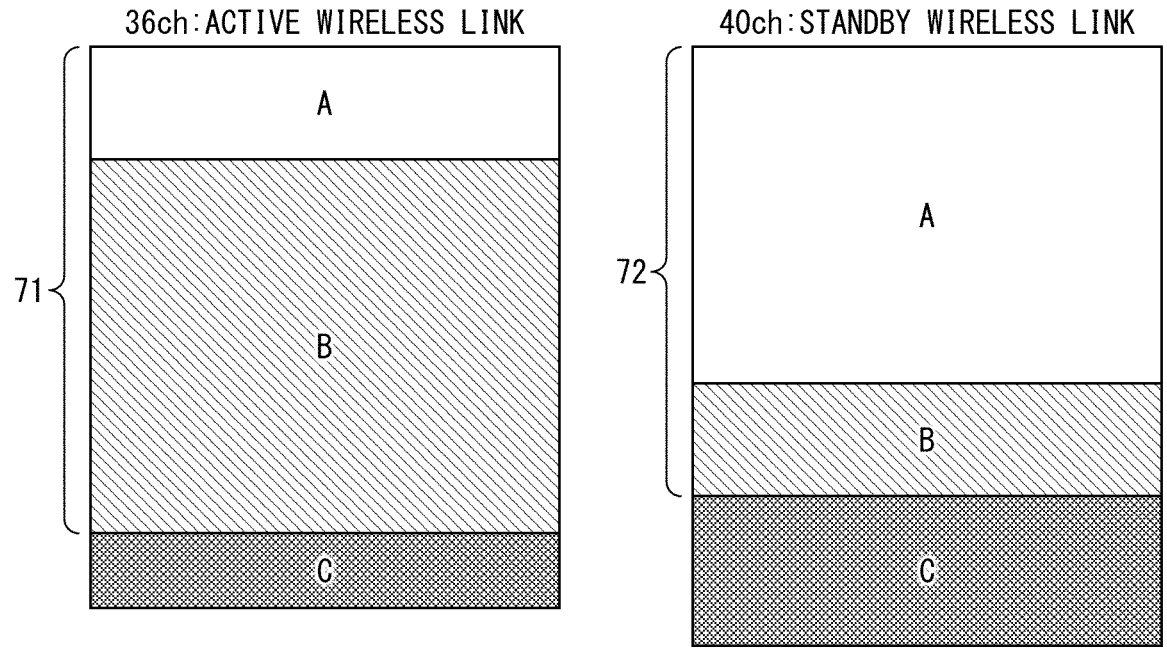
(AFTER CORRECTION)
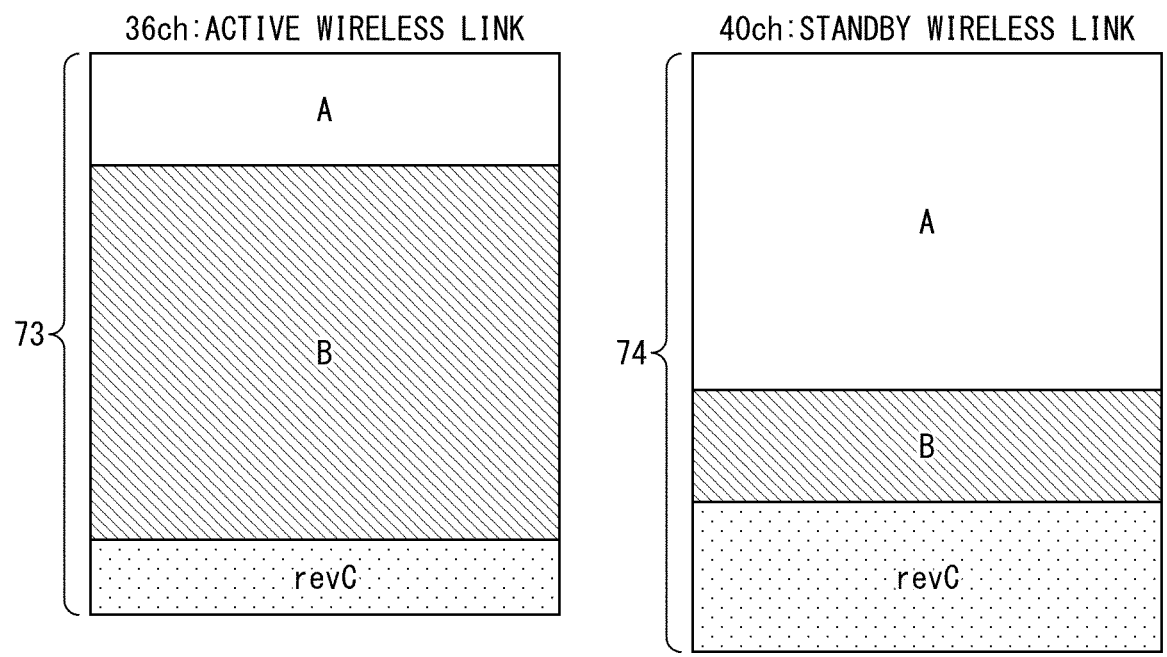

COMMUNICATION SYSTEM, COMMUNICATION DEVICE, WIRELESS LINK SELECTION METHOD

This application is a National Stage Entry of PCT/JP2021/007557 filed on Feb. 26, 2021, the contents of all of which are incorporated herein by reference, in their entirety.

TECHNICAL FIELD

The present invention relates to a technique for selecting a wireless link in a wireless communication system.

BACKGROUND ART

Patent Literature 1 discloses a method for selecting a channel so as to minimize the influence of interference waves between a wireless communication system of interest and another wireless communication system. Specifically, according to the channel selection method disclosed in Patent Literature 1, the status of channel usage of the wireless communication system of interest is investigated for each of the channels to be selected, and as the status of channel usage of another wireless communication system, interference wave power is investigated, for example. Subsequently, on the basis of the results of investigating all of the channels to be selected, a channel that causes the interference wave power to be minimized is selected as the channel to be used for wireless communication in the wireless communication system of interest.

In addition, Patent Literature 2 discloses a wireless channel selection method in which the interference from another channel is considered. Specifically, according to the wireless channel selection method disclosed in Patent Literature 2, the received power-to-PER characteristic corresponding to a combination of the value of the degree of adjacency of interference and the value of intensity of interference signal is measured in advance for each manufacturer or for each manufacturing model number, in relation to each of the channels which are candidates for use. Subsequently, the degree of interference based on the received power-to-PER characteristic above is calculated, and a channel that causes the degree of interference to be minimized is selected.

CITATION LIST

Patent Literature

[Patent Literature 1]
Japanese Patent Application Publication, Tokukai, No. 2002-186019
[Patent Literature 2]
Japanese Patent Application Publication, Tokukai, No. 2008-78698

SUMMARY OF INVENTION

Technical Problem

Incidentally, in a case where a communication apparatus includes a plurality of wireless sections, it is desirable to consider the interference between radio sections in the same communication apparatus.

An example aspect of the present invention has been made in view of the above problems, and an example object thereof is to provide a technique for successfully stabilizing wireless communication by considering the degree of interference between radio sections in a communication apparatus in which switching of a plurality of wireless links is carried out via a plurality of radio sections.

Solution to Problem

A communication system in accordance with an example aspect of the present invention includes at least one processor, the at least one processor carrying out: a process of acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link; a process of calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link; a process of correcting the communication-time performance parameter in accordance with a bandwidth which is identified with use of the degree of interference and which is receiving interference; and a process of selecting a wireless link to be used for communication from among the first wireless link and the second wireless link, in accordance with the communication-time performance parameter corrected.

A communication apparatus in accordance with an example aspect of the present invention includes at least one processor, the at least one processor carrying out: a process of acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link; a process of calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link; a process of correcting the communication-time performance parameter in accordance with a bandwidth which is identified with use of the degree of interference and which is receiving interference; and a process of selecting a wireless link to be used for communication from among the first wireless link and the second wireless link, in accordance with the communication-time performance parameter corrected.

A wireless link selection method in accordance with an example aspect of the present invention includes: acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link; calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link; correcting the communication-time performance parameter in accordance with a bandwidth which is identified with use of the degree of interference and which is receiving interference; and selecting a wireless link to be used for communication from among the first wireless link and the second wireless link, in accordance with the communication-time performance parameter corrected.

Advantageous Effects of Invention

An example aspect of the present invention makes it possible to successfully stabilize wireless communication by considering the degree of interference between wireless links in a communication apparatus in which switching of a plurality of wireless links is carried out via a plurality of radio sections.

BRIEF DESCRIPTION OF DRAWINGS

FIG. 7 is a diagram illustrating an example of a performance parameter.

EXAMPLE EMBODIMENTS

First Example Embodiment

The following description will discuss a first example embodiment of the present invention in detail, with reference to the drawings. The present example embodiment is basic to the example embodiments that will be described later.

<Configuration of Communication Apparatus>

Figure 1:
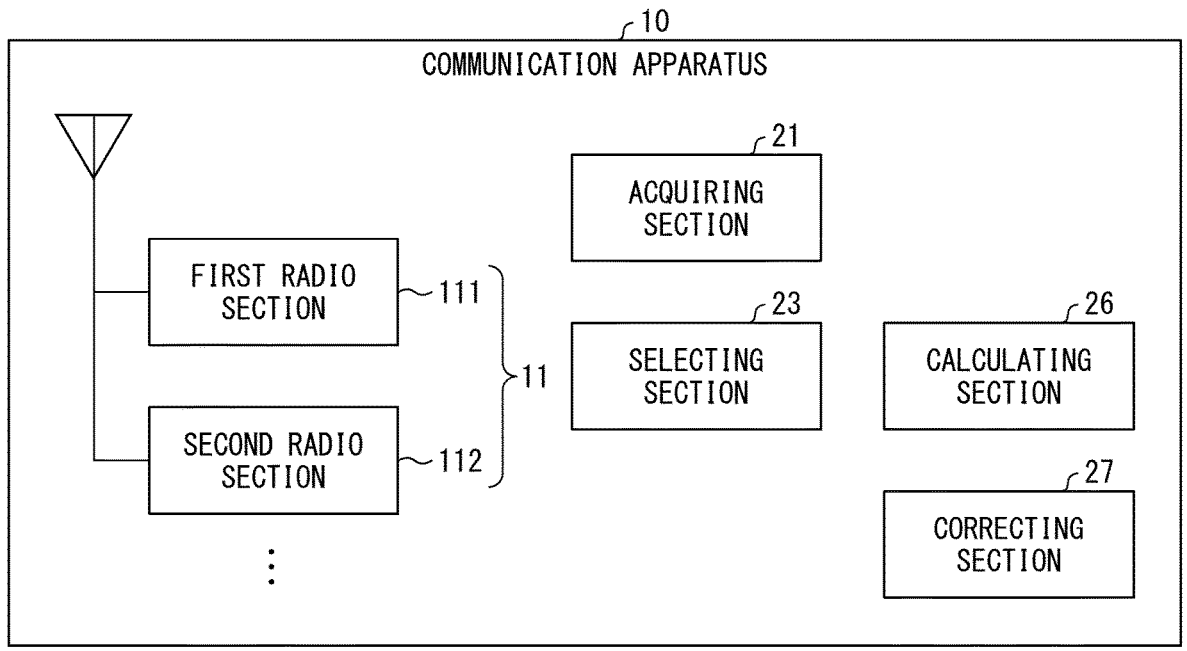
FIG. 1 is a block diagram indicating the configuration of a communication apparatus in accordance with a first example embodiment of the present invention.

The configuration of a communication apparatus 10 in accordance with the present example embodiment will be described with reference to FIG. 1. FIG. 1 is a block diagram illustrating the configuration of the communication apparatus 10. The communication apparatus 10 conducts wireless communication via any of a plurality of radio sections 11.

As illustrated in FIG. 1, the communication apparatus 10 includes: radio sections 11; an acquiring section 21; a calculating section 26; a correcting section 27; and a selecting section 23. Although two radio sections 11 which are a first radio section 111 and a second radio section 112 are illustrated as examples of the radio sections 11 in FIG. 1, the communication apparatus 10 may include three or more radio sections. For example, the communication apparatus 10 may further include a third radio section, a fourth radio section, and the like that are not illustrated.

The radio sections 11 are physical components for establishing a wireless link with, for example, an apparatus such as a wireless access point (hereinafter, wireless AP). The communication apparatus 10 establishes a plurality of wireless links via the respective radio sections 11. A wireless channel is configured for each of the wireless links. The radio sections 11 use a frequency bandwidth corresponding to the configured wireless channel to receive radio signals emitted by the wireless APs or the like, to conduct wireless communication. The radio sections 11 may acquire a performance parameter under the control of the acquiring section 21 (described below), the performance parameter being information used in evaluating the communication performance of a configured wireless link, such as a received signal strength indication (RSSI) or a busy time.

The acquiring section 21 is a component that provides the acquiring means in the present example embodiment. The calculating section 26 is a component that provides the calculating means in the present example embodiment. The correcting section 27 is a component that provides the correcting means in the present example embodiment. The selecting section 23 is a component that provides the selecting means in the present example embodiment.

The acquiring section 21 acquires a communication-time performance parameter and a non-communication-time performance parameter for each of the wireless links, the communication-time performance parameter representing a wireless link communication performance indicated in a case where the communication apparatus 10 is conducting wireless communication, the non-communication-time performance parameter representing a wireless link communication performance indicated in a case where the communication apparatus 10 is not conducting wireless communication.

The calculating section 26 calculates the degree of interference for each of the wireless links that are used by the communication apparatus 10 that conducts wireless communication with use of at least one selected from the group consisting of the first wireless link and the second wireless link. The degree of interference indicates a degree to which a second wireless channel configured for the second wireless link receives interference from a first wireless channel configured for the first wireless link in a case where communication is being conducted via the first wireless link. The calculating section 26 calculates the degree of interference above, in accordance with the communication-time performance parameter and the non-communication-time performance parameter, for each of the wireless links.

For example, in a case where the communication apparatus 10 is not conducting communication, the acquiring section 21 acquires the non-communication-time performance parameter of the first radio section 111 and the non-communication-time performance parameter of the second radio section 112. In a case where the communication apparatus 10 starts conducting communication via the first radio section 111, the acquiring section 21 acquires the communication-time performance parameter of the second radio section 112. In a case where the communication apparatus 10 starts transmitting and receiving, via the second radio section 112, communication packets for control, the acquiring section 21 may acquire the communication-time performance parameter of the first radio section 111.

In this context, there is a possibility that the communication performance represented by the communication-time performance parameter of a wireless link established by the second radio section 112 is underestimated due to reception of a certain amount of influence of interference from the wireless channel used by the first radio section 111 which is conducting communication. The extent of the influence can depend on, for example, the degree of adjacency between the wireless channel of the first radio section 111 and the wireless channel of the second radio section 112 or the physical position relationship between the first radio section 111 and the second radio section 112.

As an example, the calculating section 26 compares the non-communication-time performance parameter of the second radio section 112 that is acquired immediately before the start of wireless communication via the first radio section 111, with the communication-time performance parameter of the second radio section 112 that is acquired immediately after the start of the above wireless communication. In accordance with a difference between the non-communication-time performance parameter immediately before the start of the wireless communication and the communication-time performance parameter immediately after the start of the wireless communication, the calculating section 26 then calculates the degree of interference to which the second wireless link of the second radio section 112 receives interference from the first radio section 111.

The correcting section 27 corrects the communication-time performance parameter acquired by the acquiring section 21, for each of the wireless links, in accordance with the degree of interference calculated by the calculating section 26. As an example, the correcting section 27 uses the degree of interference calculated, to identify a bandwidth of the second wireless channel, the bandwidth receiving interference from the first wireless channel. The correcting section 27 corrects the communication-time performance parameter in accordance with the bandwidth, which is identified and which is receiving interference. By the correction of the communication-time performance parameter, a bandwidth that was not regarded as being usable for communication due to reception of interference is considered as a bandwidth usable for communication in a case where the communication performance of the wireless link is evaluated. Hereinafter, the bandwidth usable for communication is referred to as an available bandwidth.

As an example, the correcting section 27 corrects the communication-time performance parameter of a wireless link established by the second radio section 112, in accordance with the degree of interference. With this correction, the communication-time performance parameter of the wireless link established via the second radio section 112 is corrected so as to represent an available bandwidth that is available in a case where the first radio section 111 is not used for communication but the second radio section 112 is used for the communication.

The selecting section 23 selects a wireless link used for communication, in accordance with the communication-time performance parameter corrected. For example, the selecting section 23 selects a wireless link used for communication from among the first wireless link and the second wireless link. More specifically, the selecting section 23 compares the communication-time performance parameter of the wireless link established by the first radio section 111 that conducts wireless communication, with the communication-time performance parameter corrected of the wireless link established by the second radio section 112. The selecting section 23 then selects, as an active wireless link used for communication, a wireless link having higher communication performance, which is, for example, a wireless link having a wide available bandwidth.

<Process Flow of Wireless Link Selection Method>

Figure 2:
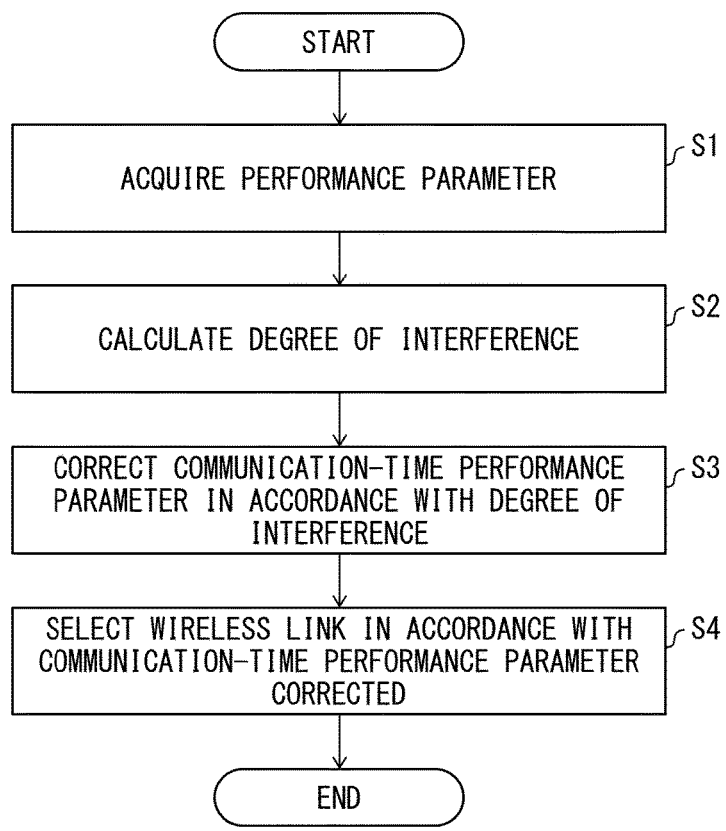
FIG. 2 is a flowchart indicating the process flow of a wireless link selection method in accordance with the first example embodiment of the present invention.

The process flow of a wireless link selection method in accordance with the present example embodiment will be described with reference to FIG. 2. FIG. 2 is a flowchart illustrating the process flow of the wireless link selection method. As illustrated in FIG. 2, the wireless link selection method includes at least step S1, step S2, step S3, and step S4.

In step S1 (acquiring step), the acquiring section 21 acquires a communication-time performance parameter and a non-communication-time performance parameter for each of a plurality of wireless links established via the plurality of radio sections 11, which are, for example, the first wireless link and the second wireless link, the communication-time performance parameter representing a wireless link communication performance indicated in a case where the communication apparatus 10 that conducts wireless communication with use of at least one selected from the group consisting of the first wireless link and the second wireless link is conducting wireless communication, the non-communication-time performance parameter representing a wireless link communication performance indicated in a case where the aforementioned communication apparatus is not conducting wireless communication.

In step S2 (calculating step), the calculating section 26 calculates the degree of interference in accordance with the communication-time performance parameter and the non-communication-time performance parameter of the second wireless link, the degree of interference representing a degree to which the second wireless channel configured for the second wireless link receives interference, during wireless communication conducted with use of the first wireless link, from the first wireless channel configured for the first wireless link.

In step S3 (correcting step), the correcting section 27 corrects the communication-time performance parameter in accordance with a bandwidth which is identified with use of the degree of interference and which is receiving interference.

In step S4 (selecting step), a wireless link used for communication is selected from among the plurality of wireless links, which is, for example, the first wireless link and the second wireless link, in accordance with the communication-time performance parameter corrected.

<Communication System>

Figure 10:
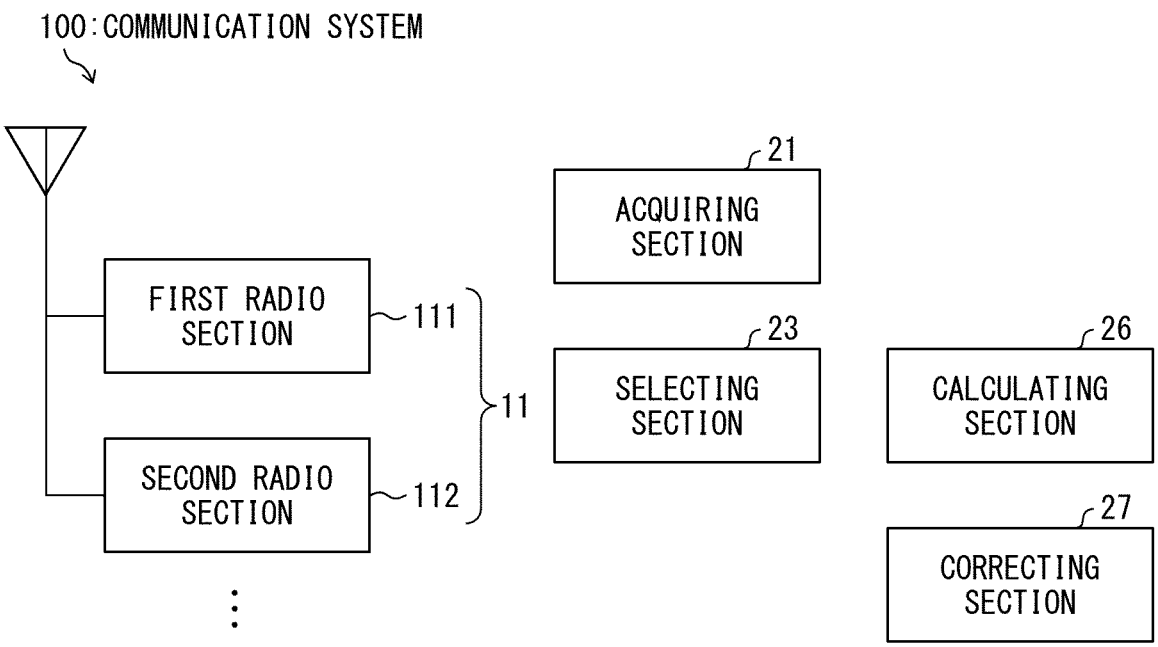
FIG. 10 is a block diagram indicating the configuration of a communication system in accordance with the first example embodiment of the present invention.

A communication system in accordance with the present example embodiment will be described with reference to FIG. 10. FIG. 10 is a block diagram illustrating the configuration of a communication system 100.

As illustrated in FIG. 10, the communication system 100 includes: the radio sections 11; the acquiring section 21; the calculating section 26; the correcting section 27; and the selecting section 23. Although two radio sections 11 which are the first radio section 111 and the second radio section 112 are illustrated as examples of the radio sections 11 in FIG. 10, the communication system 100 may include three or more radio sections. For example, the communication system 100 may further include a third radio section, a fourth radio section, and the like that are not illustrated.

Like each of the sections of the communication apparatus 10, the acquiring section 21 is a component that provides the acquiring means in the present example embodiment. The calculating section 26 is a component that provides the calculating means in the present example embodiment. The correcting section 27 is a component that provides the correcting means in the present example embodiment. The selecting section 23 is a component that provides the selecting means in the present example embodiment.

As illustrated in FIG. 10, not all of the acquiring section 21, the calculating section 26, the correcting section 27, and the selecting section 23 may be incorporated in the same communication apparatus 10, and may be distributed so as to be incorporated in several communication apparatuses. The present disclosure covers such a communication system 100, which is constituted by the several communication apparatuses above in which the sections above are incorporated in a distributed manner.

As above, a configuration employed in the communication system 100 in accordance with the present example embodiment is the configuration in which included are: an acquiring section 21 for acquiring a communication-time performance parameter and a non-communication-time performance parameter for each of a first wireless link and a second wireless link, the communication-time performance parameter representing a wireless link communication performance which is indicated in a case where a communication apparatus 10 is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link; a calculating section 26 for calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link; a correcting section 27 for correcting the communication-time performance parameter in accordance with a bandwidth which is identified with use of the degree of interference and which is receiving interference; and a selecting section 23 for selecting a wireless link to be used for communication from among the first wireless link and the second wireless link, in accordance with the communication-time performance parameter corrected.

Further, a configuration employed in the communication apparatus 10 in accordance with the present example embodiment is the configuration in which included are: an acquiring section 21 for acquiring a communication-time performance parameter and a non-communication-time performance parameter for each of a first wireless link and a second wireless link, the communication-time performance parameter representing a wireless link communication performance which is indicated in a case where a communication apparatus 10 is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link; a calculating section 26 for calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link; a correcting section 27 for correcting the communication-time performance parameter in accordance with a bandwidth which is identified with use of the degree of interference and which is receiving interference; and a selecting section 23 for selecting a wireless link to be used for communication from among the first wireless link and the second wireless link, in accordance with the communication-time performance parameter corrected.

Furthermore, a configuration employed in the wireless link selection method in accordance with the present example embodiment is the configuration in which included are: an acquiring step (S1) of acquiring a communication-time performance parameter and a non-communication-time performance parameter for each of a first wireless link and a second wireless link, the communication-time performance parameter representing a wireless link communication performance which is indicated in a case where a communication apparatus 10 is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link; a calculating step (S2) of calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link; a correcting step (S3) of correcting the communication-time performance parameter in accordance with a bandwidth which is identified with use of the degree of interference and which is receiving interference; and a selecting step (S4) of selecting a wireless link to be used for communication from among the first wireless link and the second wireless link, in accordance with the communication-time performance parameter corrected.

Thus, with the communication system 100, the communication apparatus 10, and the wireless link selection method in accordance with the present example embodiment, the communication-time performance parameter measured regarding a wireless link is corrected in consideration of the degree of interference received from a wireless channel configured for the first radio section, which is conducting wireless communication. This makes it possible to properly evaluate the communication performance of each of the wireless links, in accordance with the communication-time performance parameter corrected. As a result, it is possible to properly select an optimum wireless link in accordance with properly evaluated communication performance. This provides an example advantage of being capable of successfully stabilizing wireless communication.

Second Example Embodiment

The following description will discuss a second example embodiment of the present invention in detail, with reference to the drawings. The same reference sign is assigned to a component that has the same function as the component described in the first example embodiment, and the description thereof is omitted where appropriate.

<Outline of Application System>

Figure 3:
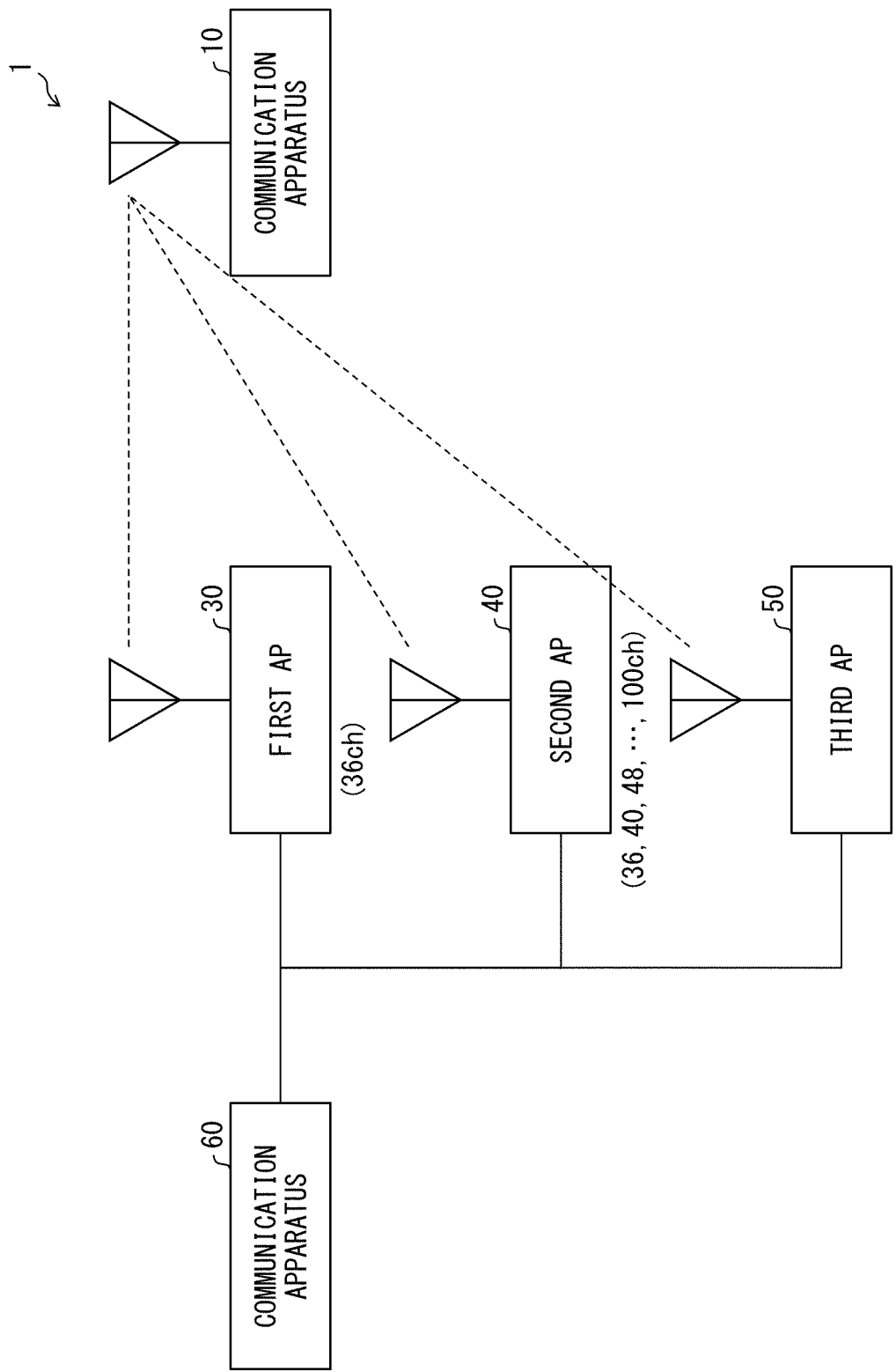
FIG. 3 is a diagram indicating an example of a communication system in accordance with a second example embodiment of the present invention.

FIG. 3 is a diagram illustrating an example of an application system in the present example embodiment. An application system 1 is a system that is implemented as, for example, a wireless local area network (LAN) communication system and that is the communication system 100 (FIG. 10) of the first example embodiment or a system to which the communication apparatus 10 (FIG. 1) of the first example embodiment is applied.

The application system 1 is not limited to this, but may be, as an example, a production-support system that leads to increased work efficiency by mutual wireless communication among a plurality of client apparatuses operating in a factory. In the application system 1, examples of the plurality of client apparatuses intended encompass a mobile object such as an AGV and a mobile terminal such as a tablet.

In FIG. 3, the application system 1 includes: a communication apparatus 10; a plurality of wireless APs 30, 40, 50, . . . ; and another communication apparatus 60 which is an apparatus at the other end of communication of the communication apparatus 10. In the application system 1, the communication apparatus 60, which is the apparatus at the other end of the communication, may be a communication apparatus having the same configuration that the communication apparatus 10 of the present disclosure has, or may be wirelessly connected to each of the wireless APs.

In a case where the application system 1 is the production-support system described above, each of the client apparatuses such as the mobile object and the mobile terminal may incorporate the communication apparatus 10 described in the first example embodiment.

In the production-support system, the plurality of wireless APs (a first AP30, a second AP40, a third AP50, . . . ) are disposed in, for example, a factory. This increases an area coverage that allows wireless communication of the mobile object or the mobile terminal. Thus, the communication apparatus 10 of the mobile object or the mobile terminal moves to and fro through the factory while switching the wireless APs used and conducts wireless communication to smoothly accomplish the work.

Although, as an example, two communication apparatuses and three wireless APs are illustrated in the application system 1, the numbers of the communication apparatuses and the wireless APs included in the application system 1 are not limited to these numbers. For convenience, the three wireless APs are referred to as respective names which are the first AP30, the second AP40, and the third AP50, for distinction. However, in a case where it is unnecessary to make a distinction among these wireless APs, the three wireless APs are collectively referred to as APs.

The communication apparatus 10 is configured so as to be capable of communicating with the APs via wireless links established by a plurality of radio sections 11. As an example, the communication apparatus 10 may be a network interface card (NIC) included in the client apparatuses in the application system 1. In this context, the plurality of radio sections 11 included in the communication apparatus 10 may be configured so as to be connected to the same AP. Alternatively, different radio sections 11 may be configured so as to be connected to different APs. The same wireless channel may be configured for each of the wireless links established via the respective radio sections 11, or different wireless channels may be configured for different wireless links.

The communication apparatus 60 is an apparatus at the other end of the communication of the communication apparatus 10. As an example, the communication apparatus 60 may be an NIC included in a server apparatus in the application system 1.

Upon startup, the communication apparatus 10 measures, for each of the wireless links, the degree of congestion that is indicated during the period in which wireless communication is not being conducted, that is, during non-communication time and that is necessary for the calculation of an available bandwidth, before starting wirelessly communicating with the communication apparatus 60 via the APs. The communication apparatus 10 measures the degree of congestion of each of the wireless links indicated during non-communication time. In the present example embodiment, as an example, the degree of congestion measured at a point in time immediately before the start of wireless communication can be used as the degree of congestion indicated during non-communication time. As another example, the acquiring section 21 may use, as the non-communication-time performance parameter, the average of the degrees of congestion observed in several seconds immediately before the start of wireless communication. For example, the degree of congestion may be represented as the proportion (%) of a busy time to a communication possible period (active time), or may be the busy time itself.

The communication apparatus 10 also checks the degree of interference with the other radio section 11 indicated in a case where the radio section 11 to be evaluated is conducting wireless communication. Hereinafter, the radio section 11 that is used during communication ahead of any other radio section 11 is referred to as an active radio section 11. As an example, the first radio section 111 may be selected as the active radio section 11. The radio section 11 that is other than the active radio section 11 and that is on standby during communication is referred to as a standby radio section 11. As an example, the second radio section 112 may be selected as the standby radio section 11.

Hereinafter, a wireless link established by the active radio section 11, that is, a wireless link used for wireless communication with, for example, the communication apparatus 60 is referred to as an active wireless link. A wireless link established by the standby radio section 11, that is, a wireless link kept on standby until being used for the wireless communication instead of the active wireless link is referred to as a standby wireless link. In addition, a wireless channel configured for the active wireless link is referred to as an active wireless channel, and a wireless channel configured for the standby wireless link is referred to as a standby wireless channel.

The communication apparatus 10 checks the degree of interference that indicates a degree to which the standby wireless channel of the second radio section 112 receives interference from the active wireless channel of the first radio section 111.

<Configuration of Communication Apparatus>

Figure 4:
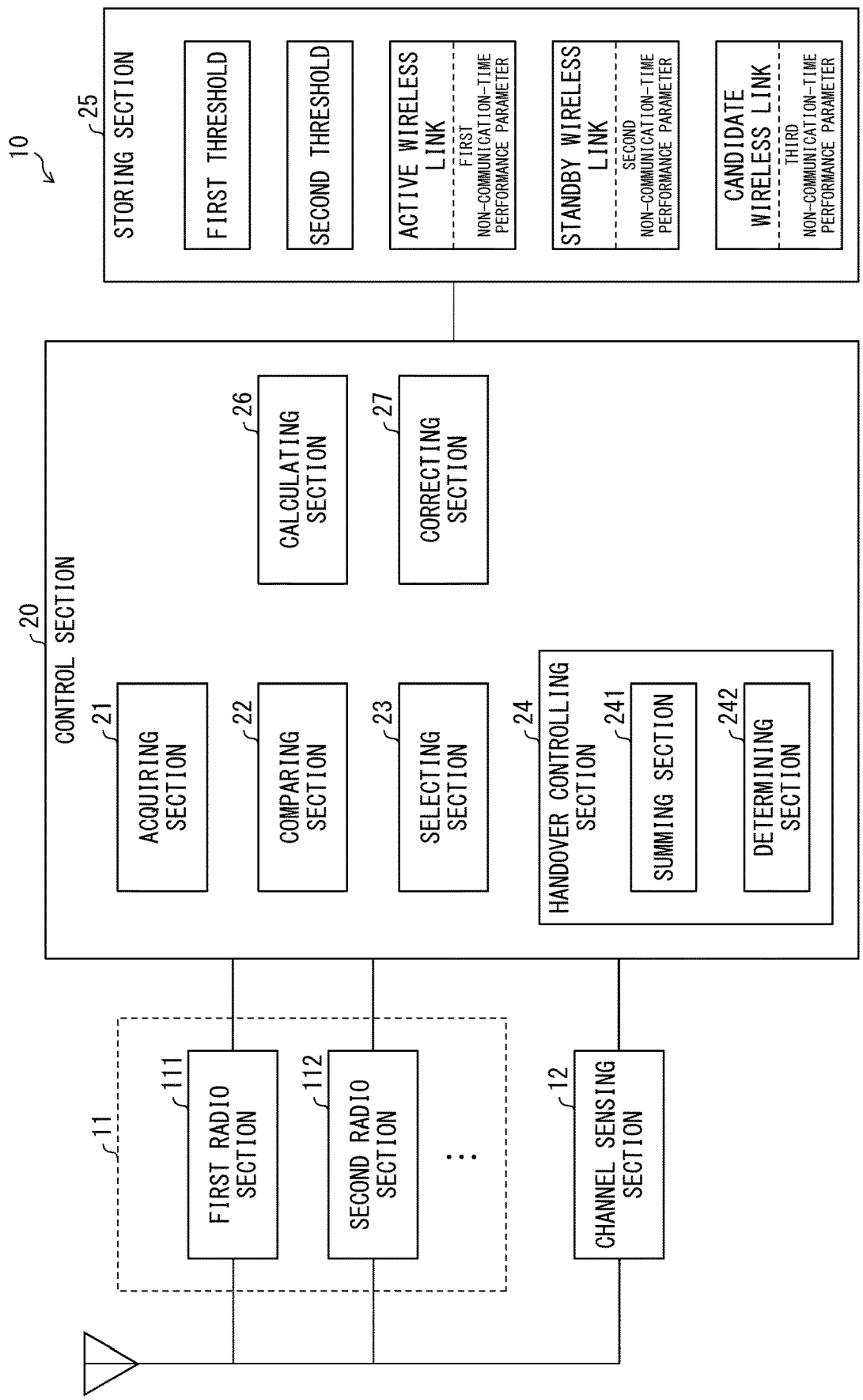
FIG. 4 is a block diagram of the configuration of a communication apparatus in accordance with the second example embodiment of the present invention.

The configuration of the communication apparatus 10 in accordance with the present example embodiment will be described with reference to FIG. 4. FIG. 4 is a block diagram illustrating the configuration of the communication apparatus 10.

As illustrated n FIG. 4, the communication apparatus 10 includes, as an example, radio sections 11, a channel sensing section 12, a control section 20, and a storing section 25. The control section 20 is constituted by, for example, computing equipment such as a central processing unit (CPU) or a dedicated processor. The control section 20 may further include a comparing section 22 and a handover controlling section 24, in addition to the acquiring section 21, the calculating section 26, the correcting section 27, and the selecting section 23 that are described in the first example embodiment. The above computing equipment retrieves a program stored in storage (e.g., storing section 25) which is provided by a read only memory (ROM) or the like and loads the program into a random access memory (RAM) or the like and executes the program, so that the corresponding section of the control section 20 can be provided.

The comparing section 22 is a component that provides the comparing means in the present example embodiment. The handover controlling section 24 is a component that provides the selecting means in the present example embodiment.

The storing section 25 stores various kinds of information that are processed by the control section 20.

Two radio sections 11 are illustrated in the example illustrated. However, the number of the radio sections 11 is not limited to this, but three radio sections 11 may be included.

The channel sensing section 12 acquires, for example, an RSSI and a busy time regarding a handover (HO) candidate channel, that is, a candidate suitable as the standby wireless link established via the standby radio section 11. The channel sensing section 12 may be included in each of the radio sections 11. Hereinafter, the candidate suitable as the standby wireless link is referred to as a standby candidate wireless link (hereinafter, candidate wireless link), and a wireless channel configured for the candidate wireless link is referred to as a standby candidate wireless channel (hereinafter, candidate wireless channel).

The acquiring section 21 of the control section 20 acquires a performance parameter for evaluating the communication performance of each of the wireless links configured for each of the first radio section 111 and the second radio section 112. As an example, the performance parameter may be information indicating at least one selected from the group consisting of the degree of congestion and an available bandwidth, in the present example embodiment. The communication-time performance parameter of the active wireless link that is acquired in a case where the first radio section 111 serving as the active radio section 11 is conducting wireless communication is hereinafter referred to as a first communication-time performance parameter. As to the second radio section 112 serving as the standby radio section 11, the communication-time performance parameter of the standby wireless link acquired in a case where the first radio section 111 is conducting wireless communication is hereinafter referred to as a second communication-time performance parameter.

The acquiring section 21 may further acquire, via the channel sensing section 12, the communication-time performance parameter of a candidate wireless link which is a candidate for being configured for the standby radio section 11. Hereinafter, the communication-time performance parameter of the candidate wireless link is referred to as a third communication-time performance parameter.

The acquiring section 21 may acquire the performance parameter of each of the active wireless link, the standby wireless link, and the candidate wireless link, at any timing in the period in which the active radio section 11 is not conducting wireless communication. The performance parameter acquired during the period in which wireless communication is not being conducted, that is, during non-communication time is hereinafter referred to as a non-communication-time performance parameter. The non-communication-time performance parameter may be stored in the storing section 25 in advance for each of the wireless links described above, or may be acquired regularly by the acquiring section 21.

Hereinafter, the non-communication-time performance parameter of the active wireless link is referred to as a first non-communication-time performance parameter. The non-communication-time performance parameter of the standby wireless link is referred to as a second non-communication-time performance parameter. The non-communication-time performance parameter of the candidate wireless link is referred to as a third non-communication-time performance parameter.

For example, the acquiring section 21 may acquire a non-communication-time performance parameter of each of the wireless links at any timing in a period from the startup of the communication apparatus 10 to the start of wireless communication. In addition, the acquiring section 21 may update the non-communication-time performance parameter repeatedly at regular intervals in a period from the end of the wireless communication via the active wireless link until the next wireless communication is started again.

The comparing section 22 compares the first communication-time performance parameter with the second communication-time performance parameter. As an example, the comparing section 22 may calculate a relative value of the second communication-time performance parameter relative to the first communication-time performance parameter. The relative value above is hereinafter referred to as a first relative value.

The comparing section 22 may further compare the second communication-time performance parameter with the third communication-time performance parameter. As an example, the comparing section 22 may calculate a relative value of the third communication-time performance parameter relative to the second communication-time performance parameter. The relative value above is hereinafter referred to as a second relative value.

The selecting section 23 selects an active wireless link to be used for wireless communication, in accordance with the result of comparison carried out by the comparing section 22. As an example, the selecting section 23 makes a selection from among the wireless link established by the first radio section 111 and the wireless link established by the second radio section 112.

More specifically, the selecting section 23 compares the first relative value determined by the comparing section 22 with a predetermined first threshold. The selecting section 23 determines whether to switch the current standby wireless link established by the second radio section 112 such that the current standby wireless link serves as the active wireless link, according to the result of comparison between the first relative value and the first threshold. The first threshold may be stored in advance in the storing section 25.

The handover controlling section 24 carries out a handover (HO) determining process for determining whether to carry out a handover, in a case where the selecting section 23 determines that the first relative value is not greater than the first threshold. In the present example embodiment, a handover refers to switching from the standby wireless link established by the standby radio section 11 to a different candidate wireless link. The handover controlling section 24 determines, in accordance with the second relative value, whether to carry out a handover.

More specifically, the handover controlling section 24 may include a summing section 241 and a determining section 242. The summing section 241 calculates a summation value obtained by summing up a plurality of second relative values calculated in a summation target period. The determining section 242 compares the above summation value with a predetermined second threshold, and determines, according to the comparison result, whether to carry out a handover. The second threshold may be stored in the storing section 25 in advance.

Specifically, in a case where the summation value calculated by the summing section 241 is greater than the second threshold, the determining section 242 determines that a handover should be carried out. The handover controlling section 24 carries out a handover according to this determination result, and switches a wireless link established by the standby radio section 11 from the current standby wireless link to the candidate wireless link.

In a case where the summation value calculated by the summing section 241 is not greater than the second threshold, the determining section 242 determines that a handover should not be carried out. Accordingly, the handover controlling section 24 does not carry out a handover, and the current standby wireless link is maintained in the standby radio section 11.

In the present example embodiment, for each of the active wireless link, the standby wireless link, and the candidate wireless link, the calculating section 26 compares the communication-time performance parameter with the non-communication-time performance parameter, to calculate the degree of interference. The active wireless link may be, for example, a wireless link established by the first radio section 111. The standby wireless link may be, for example, a wireless link established by the second radio section 112.

In the present example embodiment, the correcting section 27 corrects, in accordance with the degree of interference of each of the wireless links calculated by the calculating section 26, the corresponding communication-time performance parameter. For example, the correcting section 27 corrects the first communication-time performance parameter of the active wireless link, the second communication-time performance parameter of the standby wireless link, and the third communication-time performance parameter of the standby candidate wireless link. The correcting section 27 provides the comparing section 22 with feedback on each of the communication-time performance parameters corrected.

The comparing section 22 calculates the first relative value and the second relative value in accordance with the communication-time performance parameters corrected.

<Calculation of Degree of Interference>

Figure 5:
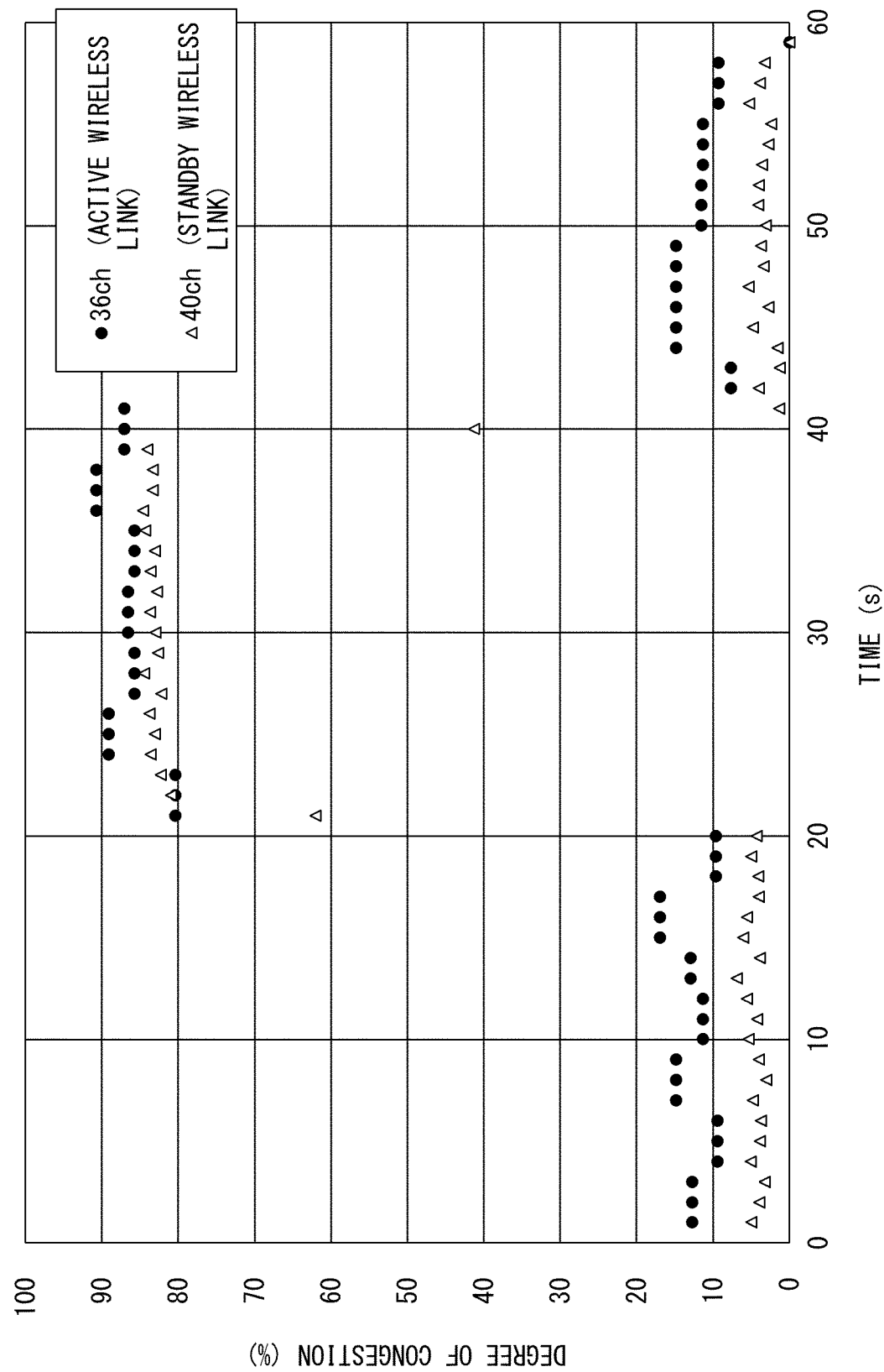
FIG. 5 is a graph indicating an example of the degree of interference calculated by a calculating section.
Figure 6:
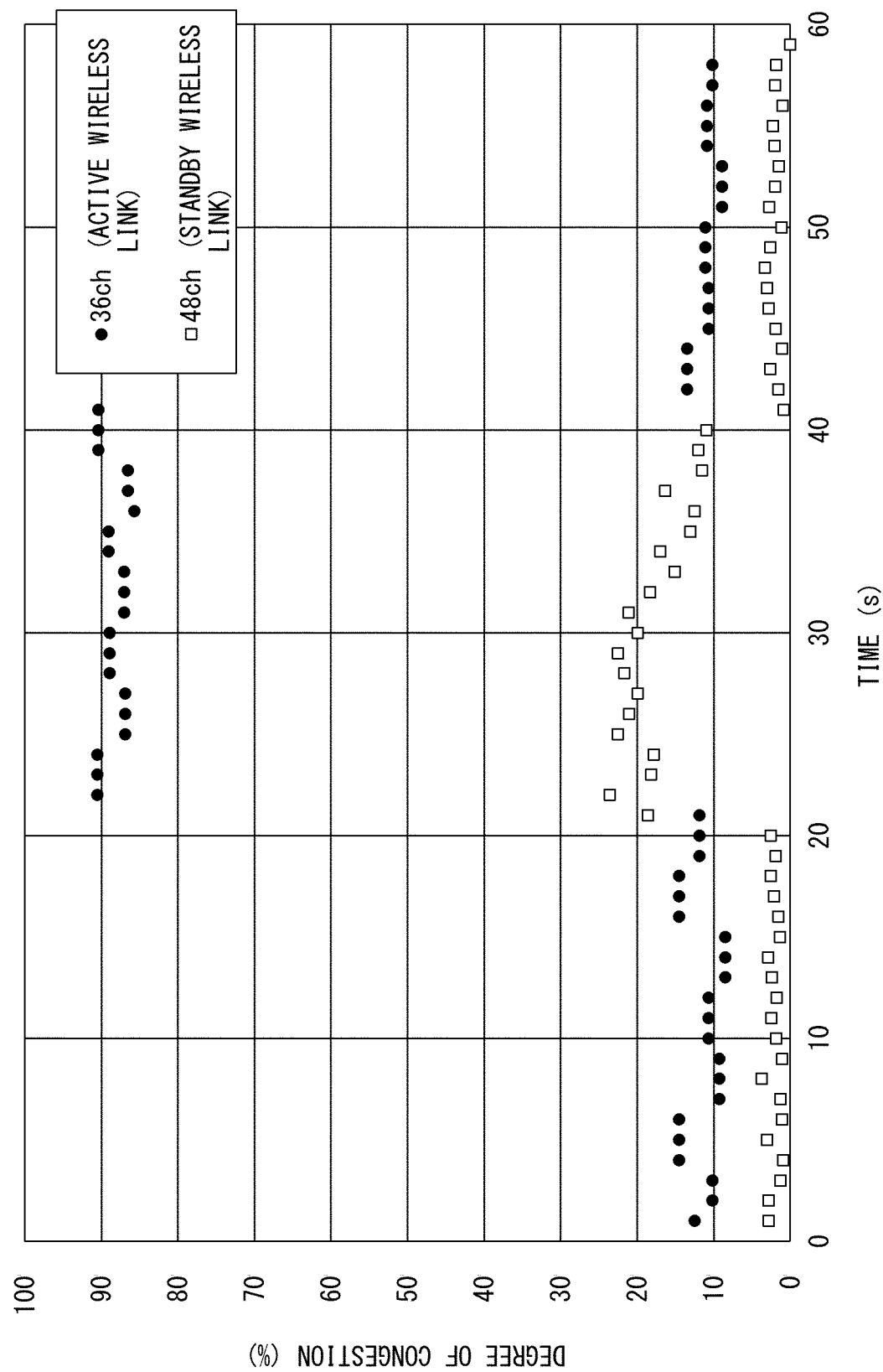
FIG. 6 is a graph indicating an example of the degree of interference calculated by the calculating section.

FIGS. 5 and 6 are graphs illustrating examples of the degree of interference calculated by the calculating section 26. In FIG. 5, the active wireless channel configured for the active wireless link is 36 ch and the standby wireless channel configured for the standby wireless link is 40 ch, and the progression of the degree of congestion of each of these wireless channels in a predetermined period is illustrated. In FIG. 6, the active wireless channel is 36 ch and the standby wireless channel is 48 ch, and the progression of the degree of congestion of each of these wireless links in a predetermined period is illustrated. In the graphs of FIGS. 5 and 6, the vertical axis represents the proportion (%) of a busy time to a communication possible period (active time), and the horizontal axis represents the time (second) lapsing from a certain point in time.

According to the graph of FIG. 5, communication is being conducted for 20 seconds between the time points of 20 seconds and 40 seconds, via the active radio section 11 for which 36 ch is configured. According to the graph of FIG. 5, the degree of congestion of 40 ch, which is configured for the standby radio section 11, abruptly increases as does 36 ch, which is in use for wireless communication, in the communication conducting period of 20 seconds described above. This shows that radio signals of 36 ch significantly interfere with radio signals of 40 ch.

According to the graph of FIG. 6, communication is being conducted for 20 seconds between the time points of 20 seconds and 40 seconds, via the active radio section 11 for which 36 ch is configured. According to the graph of FIG. 6, the degree of congestion of 48 ch, which is configured for the standby radio section 11, somewhat increases in the communication conducting period of 20 seconds described above. However, the degree of interference received by 48 ch is found to be smaller than the degree of interference received by 40 ch. As can be seen from the above, in a case where the active wireless channel and the standby wireless channel are closer to each other and the frequency bandwidth overlap is greater, the degrees of interference of radio signals are both higher. Note that the degree of interference varies depending also on the physical interval between the radio sections 11 in the same communication apparatus 10 or the transmission output power at the active radio section 11.

The calculating section 26 calculates the degree of interference of, for example, each of 40 ch and 48 ch each of which is the standby wireless channel or a standby candidate wireless channel. The calculating section 26 may calculate a difference between the degree of congestion during non-communication time (second non-communication-time performance parameter) and the degree of congestion during communication time (second communication-time performance parameter), with the difference being the degree of interference.

As an example, the calculating section 26 may calculate a difference between the degree of congestion immediately before the start of wireless communication via the active radio section 11 and the degree of congestion immediately after the start of the wireless communication, with the difference being the degree of interference. As another example, the calculating section 26 may calculate a difference between the average of the degrees of congestion in several seconds immediately before the start of the wireless communication and the average of the degrees of congestion in several seconds immediately after the start of the wireless communication, with the difference being the degree of interference. In the examples illustrated in FIGS. 5 and 6, in a case where wireless communication is started at a time point of 21 seconds, the calculating section 26 may calculate a difference between the average of the degrees of congestion during the period from time point 18 seconds to time point 20 seconds and the average of the degrees of congestion during the period from time point 22 seconds to time point 24 seconds, with the difference being the degree of interference.

<Correction of Performance Parameter>

The correcting section 27 corrects the degree of congestion during communication (second communication-time performance parameter) of each of 40 ch and 48 ch, in accordance with the degree of interference calculated. Specifically, the correcting section 27 subtracts, from the degree of congestion observed during the communication conducting period, the above-described difference, calculated by the calculating section 26, of the average degree of congestion. As a result, for each of 40 ch and 48 ch, the degree of congestion which has been estimated to be higher than in reality due to the interference of the active wireless channel (36 ch) is modified so as to indicate the real degree of congestion. This makes it possible for the comparing section 22 to regard a part which is seemingly busy due to the interference of 36 ch as an available bandwidth, as the part really is, to make an accurate evaluation.

<Calculation of Relative Value>

FIG. 7 is a diagram illustrating an example of the performance parameter used as an index in a case where the comparing section 22 make a comparison of the communication performance of each wireless link. Performance parameters used for the comparison are, for example, an available bandwidth 73 and an available bandwidth 74. As is illustrated, an available bandwidth serving as the index of the communication performance of each of the wireless links is determined as being the sum of a free bandwidth and a used bandwidth which is being used in the channel configured for a wireless link on which attention is focused for determining an available bandwidth. Hereinafter, the wireless link on which attention is focused for determining an available bandwidth is referred to as a first wireless link, and a channel configured for the first wireless link is referred to as a channel of interest. A wireless link other than the first wireless link is referred to as a second wireless link, and a channel configured for the second wireless link is referred to as the other channel.

With conventional techniques, in a case where performance parameter correction is not carried out, the communication performance of each wireless link is evaluated as follows. In a specific example, an available bandwidth 71 of the active wireless channel (36 ch), which is the channel of interest, is represented by the sum of a free bandwidth A which is free and available for communication and a used bandwidth B which is a value of actual measurement of the bandwidth used in the channel of interest. The free bandwidth A and the used bandwidth B may be calculated in accordance with a busy time.

The bandwidth C is a value of actual measurement of a bandwidth of the channel of interest, the bandwidth receiving influence of the interference of radio waves due to the communication conducted with use of the other channel. The bandwidth C is not used in the channel of interest, and is actually a free bandwidth. However, due to reception of the interference of the other channel, the bandwidth C is regarded as being in use, and is therefore a pseudo used bandwidth.

As an example, the other channel is a standby wireless channel configured for the standby wireless link, which is the second wireless link. Specifically, the other channel is, for example, 40 ch. The bandwidth C in 36 ch is a pseudo used bandwidth which is regarded as being in use because of the interference received in a case where, for example, packets necessary for control are transmitted and received on 40 ch configured for the standby wireless link. With conventional techniques, since a pseudo used bandwidth appears, to the communication apparatus, as a bandwidth which cannot be used for communication of the channel of interest, it is impossible to add the pseudo used bandwidth to an available bandwidth.

As above, in a case where correction is not carried out by the correcting section 27, the available bandwidth 71 of 36 ch, which is the active wireless channel, is represented by the sum of the free bandwidth A and the used bandwidth B.

In a case where the channel of interest is the standby wireless channel (40 ch), if a performance parameter is not corrected by the correcting section 27, an available bandwidth 72 of 40 ch is represented by the sum of the free bandwidth A and the used bandwidth B, as in 36 ch. The used bandwidth B of 40 ch is a value of actual measurement of the bandwidth used in a case where communication is conducted via the standby wireless link, that is, used for transmitting and receiving packets necessary for control on 40 ch, which is the channel of interest.

The bandwidth C is a pseudo used bandwidth that receives interference, due to communication via the active wireless link with use of 36 ch, which is the other channel. The bandwidth C is not included in the available bandwidth 72, as described above.

As above, a comparison between the available bandwidth 71 and the available bandwidth 72 the performance parameters of which are uncorrected, leads to the determination that the available bandwidth 71 of 36 ch is greater than the available bandwidth 72 of 40 ch. Accordingly, the wireless link for which 36 ch is configured can be maintained as the active wireless link. In this context, the bandwidth C is not evaluated as a free bandwidth, and there is a possibility that the communication performance of each of the wireless links is not properly evaluated.

In contrast, the correcting section 27 is capable of correcting, for example, the degree of congestion of the channel of interest, the degree of congestion being estimated to be higher than in reality due to the interference of the other channel, such that the degree of congestion is close to the real degree of congestion. For example, the degree of congestion of the standby wireless channel (40 ch), the degree of congestion being estimated to be higher than in reality due to the interference of the active wireless channel, may be corrected so as to be close to the real degree of congestion. Specifically, the correcting section 27 may change the pseudo used bandwidth C identified in accordance with the degree of interference to a free bandwidth revC, to provide the comparing section 22 with feedback so that the available bandwidth of 40 ch is evaluated with the changed free bandwidth revC being included. Also regarding the active wireless channel (36 ch), the correcting section 27 may provide the comparing section 22 with feedback so that the available bandwidth of 36 ch is evaluated with a free bandwidth revC to which the pseudo used bandwidth C resulting from the interference of the standby wireless channel has been changed being included.

In this manner, the comparing section 22 is capable of properly evaluating the communication performance of each wireless link in accordance with a performance parameter corrected. For example, the comparing section 22 compares the available bandwidth 73, which is the sum of the bandwidth A, the bandwidth B, and the bandwidth revC of 36 ch, with the available bandwidth 74, which is the sum of the bandwidth A, the bandwidth B, and the bandwidth revC of 40 ch. With this comparison, in accordance with the available bandwidth 74 being greater than the available bandwidth 73, the selecting section 23 may determine that the active wireless link should be switched from current 36 ch to 40 ch, which is the standby wireless link.

As an example, the comparing section 22 can calculate the first relative value in accordance with the available bandwidth in which the real condition is reflected as described above. Specifically, the comparing section 22 makes a comparison between the corrected available bandwidth 73 (first communication-time performance parameter) of the active wireless channel and the corrected available bandwidth 74 (second communication-time performance parameter) of the standby wireless channel. Thus, the comparing section 22 calculates a relative value of the available bandwidth 74 relative to the available bandwidth 73, with the relative value being the first relative value. The comparing section 22 may calculate a ratio of the available bandwidth 74 to the available bandwidth 73, with the ratio being the first relative value.

In a case where the first relative value calculated by the comparing section 22 is not greater than the first threshold, the selecting section 23 maintains the current active wireless channel, which is, for example, 36 ch. In a case where the first relative value is greater than the first threshold, the standby wireless channel, which is, for example, 40 ch, is switched such that the standby wireless channel serves as the active wireless channel.

In the example illustrated, in a case where correction by the correcting section 27 is not carried out, the selecting section 23 would determine, according to the relative value (which is negative in the example illustrated) of the available bandwidth 72 relative to the available bandwidth 71, that current 36 ch should be maintained. However, as a result of the correction by the correcting section 27 of the present disclosure, the selecting section 23 can determine, according to the relative value (which is positive in the example illustrated) of the available bandwidth 74 relative to the available bandwidth 73, that 40 ch can provide higher communication performance than 36 ch, and switch to 40 ch.

<Wireless Link Selection Method>

Figure 8:
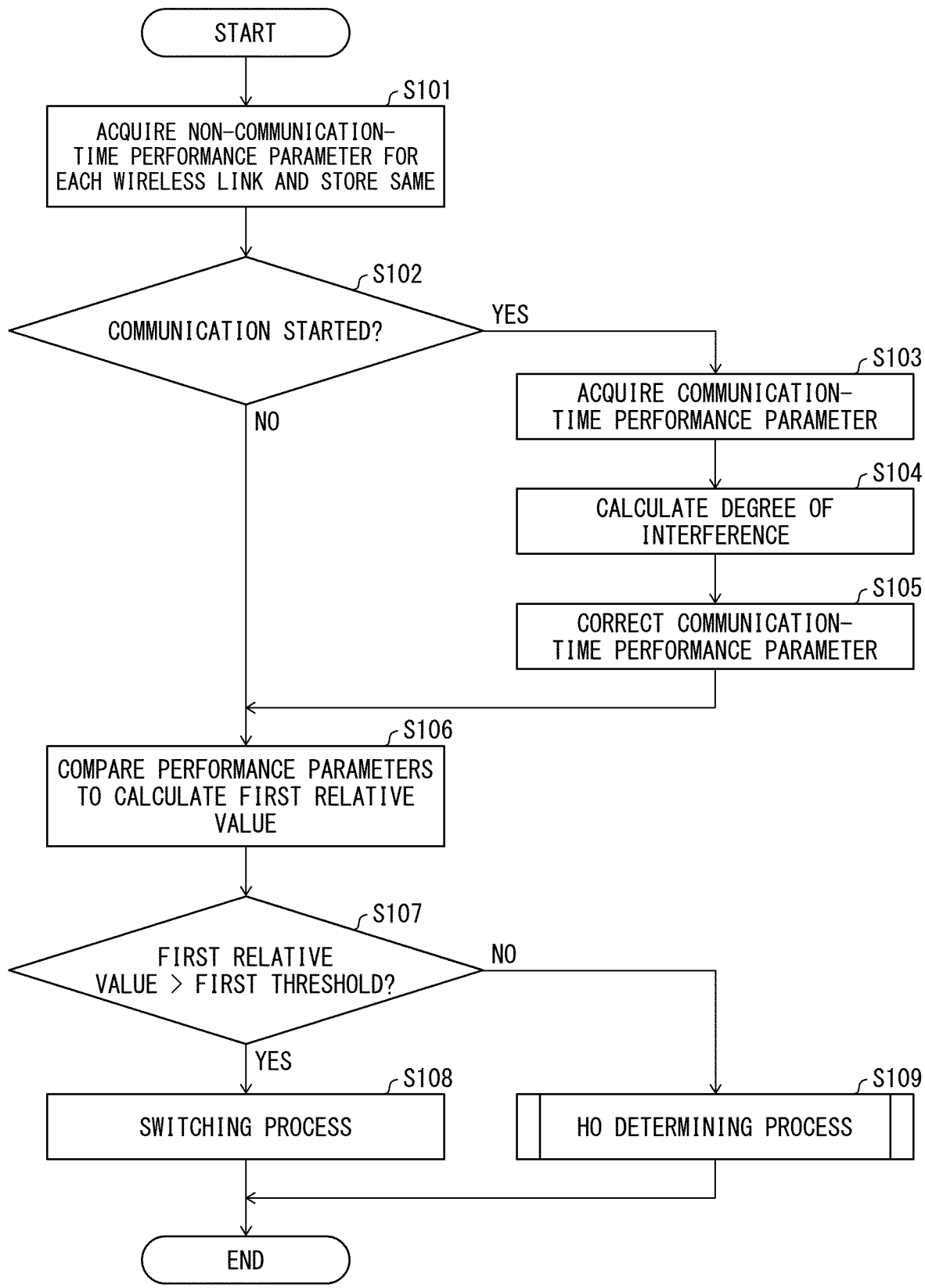
FIG. 8 is a flowchart illustrating the process flow of a wireless link selection method in accordance with the second example embodiment of the present invention.

The process flow of a wireless link selection method in accordance with the present example embodiment will be described with reference to FIG. 8. FIG. 8 is a flowchart illustrating the process flow of the wireless link selection method. Specifically, a method for selecting an active wireless link is illustrated in FIG. 8. As an example, assume that the active wireless link is established by the first radio section 111, and wireless communication of the communication apparatus is conducted by the first radio section 111. Further, assume that the standby wireless link is established by the second radio section 112, and the second radio section 112 is in a standby state. For example, a series of processes illustrated in FIG. 8 starts with startup of the communication apparatus 10.

In step S101, upon the startup, the acquiring section 21 acquires, via each of the radio sections 11, the first non-communication-time performance parameter of the active wireless link and the second non-communication-time performance parameter of the standby wireless link. Further, the acquiring section 21 acquires the third non-communication-time performance parameter of a candidate wireless link via the channel sensing section 12. The acquiring section 21 causes the above non-communication-time performance parameters acquired to be stored in the storing section 25.

The acquiring section 21 may acquire, for example, information that indicates an available bandwidth, with the information being the non-communication-time performance parameter. For example, the acquiring section 21 may determine the available bandwidth of a wireless channel in the following manner. The acquiring section 21 uses a received signal strength indication-to-maximum data rate correspondence to identify a maximum data rate corresponding to the received signal strength indication of the wireless channel. Subsequently, in accordance with a busy time acquired regarding the wireless channel, the acquiring section 21 calculates the proportion of an idle time of the wireless channel.

The acquiring section 21 may regularly repeat the above process of S101 during the period from startup to the start of communication, to update the non-communication-time performance parameter stored in the storing section 25.

In step S102, the acquiring section 21 determines whether wireless communication is being conducted via the active wireless link. In a case where communication is being conducted, the control section 20 causes the process to proceed to S103 through YES of S102. Accordingly, each wireless link is evaluated in accordance with the communication-time performance parameter corrected. In a case where communication is not being conducted, the control section 20 causes the process to proceed to S106 through NO of S102. Accordingly, each wireless link is evaluated, in accordance with the non-communication-time performance parameter which is acquired in S101 and is the latest.

In step S103, the acquiring section 21 acquires the respective communication-time performance parameters of the active wireless link, the standby wireless link, and the candidate wireless link.

In step S104, for each of the above wireless links, the calculating section 26 compares the non-communication-time performance parameter stored in S101 with the communication-time performance parameter, to calculate the degree of interference.

In step S105, for each of the above wireless links, the correcting section 27 corrects the communication-time performance parameter acquired in S103, in accordance with the degree of interference calculated in S104.

In step S106, the comparing section 22 compares the performance parameter of the active wireless link with the performance parameter of the standby wireless link. For example, the comparing section 22 calculates the first relative value necessary to select an optimum active wireless link. The first relative value calculated in this step refers to a relative value of the performance parameter of the standby wireless link relative to the performance parameter of the active wireless link.

Specifically, in a case of YES in S102, the comparing section 22 determines a difference between the first communication-time performance parameter and the second communication-time performance parameter that are corrected in S105, with the difference being the first relative value. In a case of NO in S102, the comparing section 22 determines a difference between the first non-communication-time performance parameter and the second non-communication-time performance parameter that are acquired in S101, with the difference being the first relative value.

In steps S107 to S109, the selecting section 23 selects an optimum wireless link to be used for communication. Specifically, the selection is made as follow.

In step S107, the selecting section 23 compares the first relative value determined in S106 with a predetermined first threshold. In a case where the first relative value is greater than the first threshold, the selecting section 23 causes the process to proceed to S108 through YES of S107. In a case where the first relative value is not greater than the first threshold, the selecting section 23 causes the process to proceed to S109 through NO of S107.

In step S108, the selecting section 23 determines that the active radio section 11 should be switched from the current first radio section 111 to the second radio section 112. In a case where the switching of the radio sections 11 is carried out according to this determination, the second radio section 112 operates as the active radio section 11, and the first radio section 111 operates as the standby radio section 11.

In step S109, the handover controlling section 24 carries out a handover determining process (hereinafter, HO determining process) of determining whether to carry out a handover. Specifically, in the handover determining process, the summing section 241 calculates the summation value of the second relative values calculated in the summation target period, and the determining section 242 determines whether to carry out a handover according to the result of comparison between the summation value and the second threshold, as described above.

<Wireless Link Selection Method>

Figure 9:
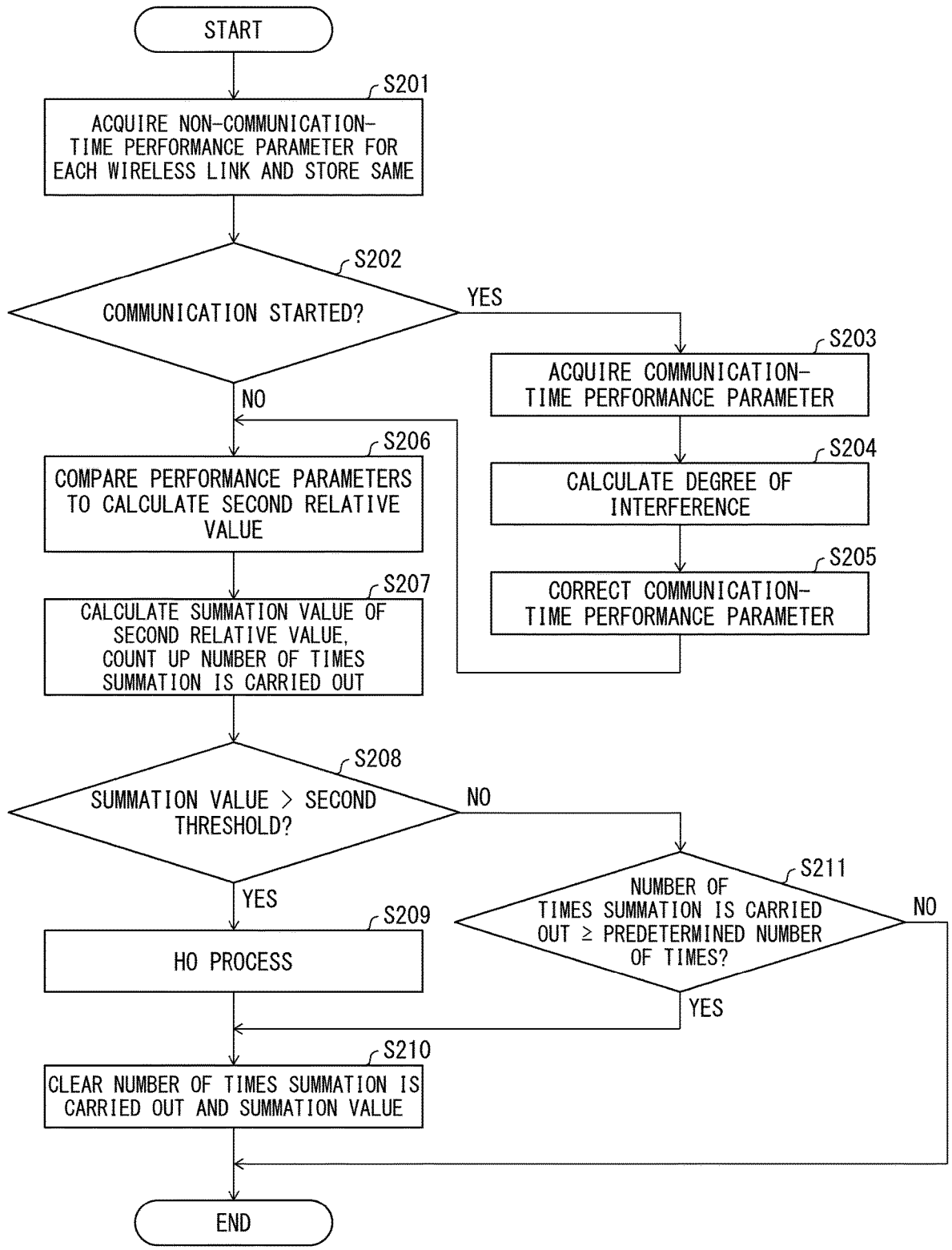
FIG. 9 is a flowchart illustrating the process flow of a wireless link selection method in accordance with the second example embodiment of the present invention.

The process flow of a wireless link selection method in accordance with the present example embodiment will be described with reference to FIG. 9. FIG. 9 is a flowchart illustrating the process flow of the wireless link selection method. Specifically, a method for selecting a standby wireless link in a handover process is illustrated in FIG. 9. As an example, assume that the active wireless channel (36 ch) is configured for the first radio section 111, and communication of the communication apparatus 10 is conducted by the first radio section 111. Further, assume that the standby wireless channel (40 ch) is configured for the second radio section 112, and the second radio section 112 is in a standby state. As the candidate wireless channel, 48 ch is available. For example, a series of processes illustrated in FIG. 9 starts with startup of the communication apparatus 10. Since steps S201 to S205 are carried out in the same way as steps S101 to S105 are, the descriptions thereof are not repeated. In addition, steps S206 to S211 correspond to the HO determining process of S109 illustrated in FIG. 8.

In step S206, the comparing section 22 compares the performance parameter of the standby wireless link with the performance parameter of the standby candidate wireless link. For example, the comparing section 22 calculates the second relative value necessary to select an optimum standby wireless link. The second relative value calculated in this step refers to a relative value of the performance parameter of the standby candidate wireless link relative to the performance parameter of the standby wireless link.

Specifically, in a case of YES in S202, the comparing section 22 determines a difference between the second communication-time performance parameter and the third communication-time performance parameter that are corrected in S205, with the difference being the second relative value. In a case of NO in S202, the comparing section 22 determines a difference between the second non-communication-time performance parameter and the third non-communication-time performance parameter that are acquired in S201, with the difference being the second relative value.

In step S207, the summing section 241 of the handover controlling section 24 sums up the second relative values calculated in S206 to determine a summation value, and counts up the number of times the summation is carried out.

In step S208, the determining section 242 compares the summation value determined in S207 with the second threshold. As a result of the comparison, in a case where the summation value is greater than the second threshold, the determining section 242 causes the process to proceed to S209 through YES of S208. In a case where the summation value is not greater than the second threshold, the determining section 242 causes the process to proceed to S211 through NO of S208.

In step S209, the determining section 242 determines that a handover should be carried out. The handover controlling section 24 carries out a handover according to this determination. For example, the handover controlling section 24 switches the standby wireless link established by the standby radio section 11 from current 40 ch to the candidate wireless link which uses 48 ch, which is the candidate wireless channel.

In step S210, the handover controlling section 24 clears the number of times that the summation is carried out and that is counted up in S207 and the summation value that is obtained by summation in S207. At this point, the control section 20 may end the series of processes to select a wireless link. In FIG. 8, in a case where the process proceeds to S109 through NO of S107, the control section 20 may cause the process to return to S201, to carry out the processes of S201 and the subsequent steps.

In step S211, the handover controlling section 24 compares the number of times that the summation is carried out and that is counted in S207 with the number of times which is defined in advance (hereinafter, predetermined number of times). The predetermined number of times may be stored in storing section 25 in advance. In a case where the number of times the summation is carried out is greater than the predetermined number of times, the handover controlling section 24 causes the process to proceed to S210 through YES of S211.

In a case where the number of times the summation is carried out is less than the predetermined number of times, the handover controlling section 24 ends the series of processes, without passing S210 through NO of S211.

As above, with the communication apparatus 10 and the wireless link selection methods in accordance with the present example embodiment, it is possible to prevent the degree of congestion of each of wireless links established via a plurality of radio sections 11 provided in one communication apparatus from being estimated to be excessively high, by considering the degree of interference between the wireless links, to properly evaluate the communication performance, such as the degree of congestion or the available bandwidth, of the wireless channel used in each of the wireless links. As a result, it is possible to accurately select a wireless link which delivers communication performance of high quality and thus successfully stabilize wireless communication.

In addition, with the communication apparatus 10 and the wireless link selection methods in accordance with the present example embodiment, the non-communication-time performance parameter and the communication-time performance parameter are regularly acquired and updated. It is therefore possible to evaluate the communication performance of each wireless link, always in accordance with the latest condition of each of the radio sections 11 of the communication apparatus 10. Further, there is no need to measure, in advance, manufacturer-specific or manufacturing model number-specific characteristics of the communication apparatus 10.

It is possible to apply the communication system 100 and the communication apparatus 10 in accordance with the example embodiments above to a production-support system which includes: automated guided vehicles (AGVs) as client apparatuses which conduct wireless communication; and a plurality of wireless APs.

The client apparatuses movable in a factory, such as AGVs or a tablet terminals, accomplish work by maintaining an environment where wireless communication is possible while switching the wireless APs to which the client apparatuses are connected. However, this switching of the wireless APs involves risks such as deterioration in the quality of communication (throughput, etc.) and a communication blackout associated with the deterioration.

One possible measure against these risks is to provide each of the client apparatuses with a plurality of radio sections (an active radio section and a standby radio section). However, the idea of the inventors of the present invention is that, in order to properly evaluate the communication performance of each wireless link to select an optimum wireless link, it is necessary to consider interference between radio sections in the same client apparatus.

With the communication system 100 and the communication apparatus 10 of the present disclosure, the available bandwidth of the wireless channel configured for each wireless link is evaluated in consideration of interference between radio sections in the same client apparatus. Thus, an optimum wireless link which leads to stable communication performance is selected in accordance with the available bandwidth that is properly evaluated. As a result, even in the production-support system in which the client apparatuses move like AGVs or the like, and frequent switching of APs is therefore necessary, it is possible to stabilize the communication performance of each client apparatus.

(Variation)

The application system 1 to which the communication apparatus 10 of the present disclosure is applied and the communication system 100 of the present disclosure are not limited to a wireless communication system via a wireless LAN, but can be applied to various wireless communication systems that are compliant with various wireless communication standards such as the fifth-generation mobile communication system (5G), long term evolution (LTE), a low power wide area-network (LPWA), Bluetooth (registered trademark), and ZigBee (registered trademark).

The acquiring section 21 uses, as a method for acquiring an available bandwidth that serves as a performance parameter, a received signal strength indication-to-maximum data rate correspondence, to calculate the proportion of an idle time in accordance with a busy time. The acquiring section 21 is no limited to this method, but may acquire an available bandwidth by, for example, the method of transmitting a packet group for measurement, which is so-called the packet train. In this case, the acquiring section 21 may estimate an available bandwidth, in accordance with the variation in packet interval in a case where the communication apparatus 60, which is on the other side, receives the packet train, that is, in accordance with jitter.

According to each of the example embodiments described above, the respective roles of the plurality of radio sections 11 are divided into the active radio section 11 for use in communication and the standby radio section 11 on standby. However, it is possible to apply the wireless link selection method of the present disclosure to a case of conducting communication via the plurality of radio sections 11 in the communication apparatus 10, that is, the case of conducting packet mirroring.

Software Implementation Example

Some or all of the functions of the communication apparatus 10 may be implemented by hardware such as an integrated circuit (IC chip), or may be implemented by software.

Figure 11:
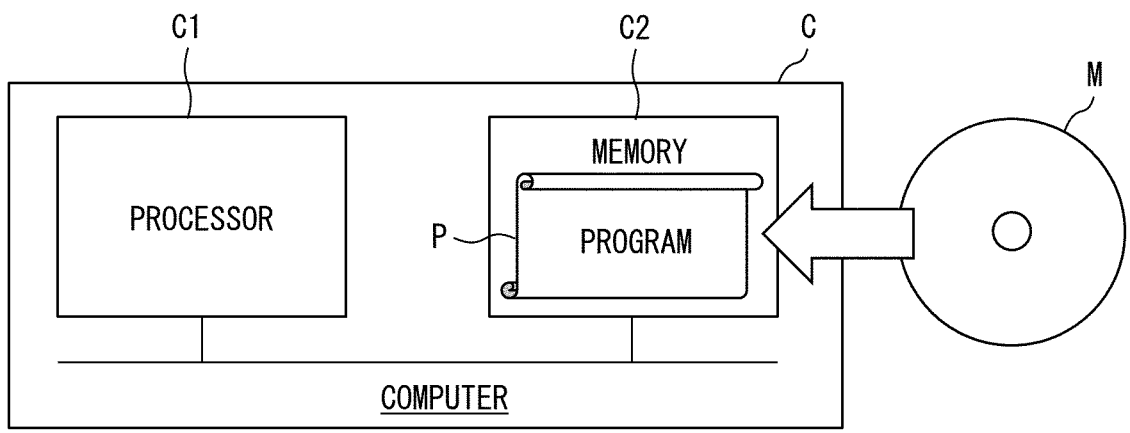
FIG. 11 is a block diagram indicating an example of a hardware configuration of the communication apparatuses of the example embodiments of the present invention.

In the latter case, the communication apparatus 10 is provided by, for example, a computer that executes instructions of a program that is software implementing the foregoing functions. An example (hereinafter, computer C) of such a computer is illustrated in FIG. 11. The computer C includes at least one processor C1 and at least one memory C2. The memory C2 stores a program P for causing the computer C to operate as the communication apparatus 10. The processor C1 of the computer C retrieves the program P from the memory C2 and executes the program P, so that the functions of the communication apparatus 10 are implemented.

Examples of the processor C1 can encompass a central processing unit (CPU), a graphic processing unit (GPU), a digital signal processor (DSP), a micro processing unit (MPU), a floating point number processing unit (FPU), a physics processing unit (PPU), a microcontroller, and a combination thereof. Examples of the memory C2 can encompass a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be stored in a computer C-readable, non-transitory, and tangible storage medium M. Examples of such a storage medium M can encompass a tape, a disk, a card, a semiconductor memory, and a programmable logic circuit. The computer C can obtain the program P via the storage medium M. Alternatively, the program P can be transmitted via a transmission medium. Examples of such a transmission medium can encompass a communication network and a broadcast wave. The computer C can also obtain the program P via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following example aspects.

(Supplementary Note 1)

A communication system including: an acquiring means for acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link;
- a calculating means for calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link;
- a correcting means for correcting the communication-time performance parameter in accordance with a bandwidth which is identified with use of the degree of interference and which is receiving interference; and
- a selecting means for selecting a wireless link to be used for communication from among the first wireless link and the second wireless link, in accordance with the communication-time performance parameter corrected.

With the above configuration, in a communication apparatus in which switching of a plurality of wireless links is carried out via a plurality of radio sections, it is possible to accurately evaluate the communication performance of each of the wireless links by considering the interference between the wireless links. As a result, it is possible to successfully stabilize wireless communication.

(Supplementary Note 2)

The communication system described in supplementary note 1, in which: the first wireless link is an active wireless link used for wireless communication, and the second wireless link is a standby wireless link which is kept on standby until being used for the wireless communication instead of the active wireless link; and
  the correcting means is configured to correct the communication-time performance parameter of the standby wireless link in accordance with a bandwidth of a standby wireless channel, the bandwidth receiving interference from an active wireless channel during communication conducted with use of the active wireless link, the standby wireless channel being a wireless channel configured for the standby wireless link, the active wireless channel being a wireless channel configured for the active wireless link.

With the above configuration, in a communication apparatus in which switching of a plurality of wireless links is carried out via a plurality of radio sections, it is possible to accurately evaluate the communication performance of a standby wireless link by considering the interference between the standby wireless link and an active wireless link. As a result, it is possible to successfully stabilize wireless communication.

(Supplementary Note 3)

The communication system described in supplementary note 2, in which: the communication-time performance parameter and the non-communication-time performance parameter include a degree of congestion of each of the active wireless channel configured for the active wireless link and the standby wireless channel configured for the standby wireless link;
  the acquiring means is configured to acquire a communication-time degree of congestion of the standby wireless channel in a case where communication via the active wireless link is being conducted and acquire a non-communication-time degree of congestion of the standby wireless channel in a case where communication via the active wireless link is not being conducted;
  the calculating means is configured to calculate a difference between the communication-time degree of congestion and the non-communication-time degree of congestion, with the difference being the degree of interference of the standby wireless link; and
  the correcting means is configured to correct the communication-time degree of congestion of the standby wireless link by performing a subtraction based on the difference from the communication-time degree of congestion.

With the above configuration, it is possible to accurately evaluate the communication performance of the standby wireless link by taking away the degree of congestion increased due to the interference received by the standby wireless link from the active wireless link. As a result, it is possible to successfully stabilize wireless communication.

(Supplementary Note 4)

The communication system described n supplementary note 3, in which: the communication-time performance parameter and the non-communication-time performance parameter further include an available bandwidth of each of the active wireless channel configured for the active wireless link and the standby wireless channel configured for the standby wireless link;
  the correcting means is configured to correct the available bandwidth of the standby wireless channel by adding a bandwidth which is identified in accordance with the difference and which is receiving interference, to the available bandwidth; and
  the selecting means is configured to determine whether to switch the standby wireless link such that the standby wireless link serves as the active wireless link, in accordance with the available bandwidth corrected.

With the above configuration, it is possible to accurately evaluate the available bandwidth of a wireless channel configured for the standby wireless link by taking away the degree of congestion increased due to the interference received by the standby wireless link from the active wireless link. As a result, it is possible to successfully stabilize wireless communication.

(Supplementary Note 5)

The communication system described in supplementary note 4, further including a comparing means for calculating a first relative value of a second available bandwidth of the standby wireless channel relative to a first available bandwidth of the active wireless channel, the second available bandwidth having been corrected, the selecting means being configured to switch the standby wireless link such that the standby wireless link serves as the active wireless link, in a case where the first relative value is greater than a first threshold.

With the above configuration, in a case where the available bandwidth of wireless channel configured for the standby wireless link is not underestimated and it is evaluated that a more sufficiently wide bandwidth can be secured, it is possible to switch the standby wireless link such that the standby wireless link serves as the active wireless link.

(Supplementary Note 6)

The communication system described in supplementary note 5, in which: a standby candidate wireless channel is configurable for the standby wireless link instead of the standby wireless channel;

the comparing means is configured to calculate a second relative value of a third available bandwidth of the standby candidate wireless channel relative to the second available bandwidth, the third available bandwidth having been corrected by the correcting means; and the selecting means is configured to configure the standby candidate wireless channel for the standby wireless link, in a case where a summation value of the second relative value in a predetermined period is greater than a second threshold.

With the above configuration, in a case where the available bandwidth of the standby candidate wireless channel is not underestimated and it is evaluated that a more sufficiently wide bandwidth can be secured, it is possible to switch the standby candidate wireless link such that the standby candidate wireless link serves as the standby wireless link.

(Supplementary Note 7)

A communication apparatus including: an acquiring means for acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link;

a calculating means for calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link;

a correcting means for correcting the communication-time performance parameter in accordance with a bandwidth which is identified with use of the degree of interference and which is receiving interference; and a selecting means for selecting a wireless link to be used for communication from among the first wireless link and the second wireless link, in accordance with the communication-time performance parameter corrected.

With the above configuration, the same example advantage that is produced by supplementary note 1 is produced.

(Supplementary Note 8)

The communication apparatus described in supplementary note 7, in which: the first wireless link is an active wireless link used for wireless communication, and the second wireless link is a standby wireless link which is kept on standby until being used for the wireless communication instead of the active wireless link; and the correcting means is configured to correct the communication-time performance parameter of the standby wireless link in accordance with a bandwidth of a standby wireless channel, the bandwidth receiving interference from an active wireless channel during communication conducted with use of the active wireless link, the standby wireless channel being a wireless channel configured for the standby wireless link, the active wireless channel being a wireless channel configured for the active wireless link.

With the above configuration, the same example advantage that is produced by supplementary note 2 is produced.

(Supplementary Note 9)

The communication apparatus described in supplementary note 8, in which: the communication-time performance parameter and the non-communication-time performance parameter include a degree of congestion of each of the active wireless channel configured for the active wireless link and the standby wireless channel configured for the standby wireless link;

the acquiring means is configured to acquire a communication-time degree of congestion of the standby wireless channel in a case where communication via the active wireless link is being conducted and acquire a non-communication-time degree of congestion of the standby wireless channel in a case where communication via the active wireless link is not being conducted;

the calculating means is configured to calculate a difference between the communication-time degree of congestion and the non-communication-time degree of congestion, with the difference being the degree of interference of the standby wireless link; and the correcting means is configured to correct the communication-time degree of congestion of the standby wireless link by performing a subtraction based on the difference from the communication-time degree of congestion.

With the above configuration, the same example advantage that is produced by supplementary note 3 is produced.

(Supplementary Note 10)

The communication apparatus described in supplementary note 9, in which: the communication-time performance parameter and the non-communication-time performance parameter further include an available bandwidth of each of the active wireless channel configured for the active wireless link and the standby wireless channel configured for the standby wireless link;

the correcting means is configured to correct the available bandwidth of the standby wireless channel by adding a bandwidth which is identified in accordance with the difference and which is receiving interference, to the available bandwidth; and the selecting means is configured to determine whether to switch the standby wireless link such that the standby wireless link serves as the active wireless link, in accordance with the available bandwidth corrected.

With the above configuration, the same example advantage that is produced by supplementary note 4 is produced.
(Supplementary Note 11)

The communication apparatus described in supplementary note 10, further including a comparing means for calculating a first relative value of a second available bandwidth of the standby wireless channel relative to a first available bandwidth of the active wireless channel, the second available bandwidth having been corrected,
  the selecting means being configured to switch the standby wireless link such that the standby wireless link serves as the active wireless link, in a case where the first relative value is greater than a first threshold.

With the above configuration, the same example advantage that is produced by supplementary note 5 is produced.
(Supplementary Note 12)

The communication apparatus described in supplementary note 11, in which: a standby candidate wireless channel is configurable for the standby wireless link instead of the standby wireless channel;
  the comparing means is configured to calculate a second relative value of a third available bandwidth of the standby candidate wireless channel relative to the second available bandwidth, the third available bandwidth having been corrected by the correcting means; and
  the selecting means is configured to configure the standby candidate wireless channel for the standby wireless link, in a case where a summation value of the second relative value in a predetermined period is greater than a second threshold.

With the above configuration, the same example advantage that is produced by supplementary note 6 is produced.
(Supplementary Note 13)

A wireless link selection method including: an acquiring step of acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link;
  a calculating step of calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link;
  a correcting step of correcting the communication-time performance parameter in accordance with a bandwidth which is identified with use of the degree of interference and which is receiving interference; and
  a selecting step of selecting a wireless link to be used for communication from among the first wireless link and the second wireless link, in accordance with the communication-time performance parameter corrected.

With the above method, the same example advantage that is produced by supplementary notes 1 and 7 is produced.
(Supplementary Note 14)

The wireless link selection method described in supplementary note 13, in which: the first wireless link is an active wireless link used for wireless communication, and the second wireless link is a standby wireless link which is kept on standby until being used for the wireless communication instead of the active wireless link; and
  in the correcting step, the communication-time performance parameter of the standby wireless link is corrected in accordance with a bandwidth of a standby wireless channel, the bandwidth receiving interference from an active wireless channel during communication conducted with use of the active wireless link, the standby wireless channel being a wireless channel configured for the standby wireless link, the active wireless channel being a wireless channel configured for the active wireless link.

With the above method, the same example advantage that is produced by supplementary notes 2 and 8 is produced.
(Supplementary Note 15)

The wireless link selection method described in supplementary note 14, in which: the communication-time performance parameter and the non-communication-time performance parameter include a degree of congestion of each of the active wireless channel configured for the active wireless link and the standby wireless channel configured for the standby wireless link;
  in the acquiring step, a communication-time degree of congestion of the standby wireless channel is acquired in a case where communication via the active wireless link is being conducted, and a non-communication-time degree of congestion of the standby wireless channel is acquired in a case where communication via the active wireless link is not being conducted;
  in the calculating step, a difference between the communication-time degree of congestion and the non-communication-time degree of congestion is calculated, with the difference being the degree of interference of the standby wireless link; and
  in the correcting step, the communication-time degree of congestion of the standby wireless link is corrected by performing a subtraction based on the difference from the communication-time degree of congestion.

With the above method, the same example advantage that is produced by supplementary notes 3 and 9 is produced.
(Supplementary Note 16)

The wireless link selection method described in supplementary note 15, in which: the communication-time performance parameter and the non-communication-time performance parameter further include an available bandwidth of each of the active wireless channel configured for the active wireless link and the standby wireless channel configured for the standby wireless link;
  in the correcting step, an available bandwidth of the standby wireless channel is corrected by adding the bandwidth which is identified in accordance with the difference and which is receiving interference, to the available bandwidth; and
  in the selecting step, whether to switch the standby wireless link such that the standby wireless link serves as the active wireless link is determined in accordance with the available bandwidth corrected.

With the above method, the same example advantage that is produced by supplementary notes 4 and 10 is produced.

(Supplementary Note 17)

The wireless link selection method described in supplementary note 16, further including a comparing step of calculating a first relative value of a second available bandwidth of the standby wireless channel relative to a first available bandwidth of the active wireless channel, the second available bandwidth having been corrected, in the selecting step, the standby wireless link being switched such that the standby wireless link serves as the active wireless link, in a case where the first relative value is greater than a first threshold.

With the above method, the same example advantage that is produced by supplementary notes 5 and 11 is produced.

(Supplementary Note 18)

The wireless link selection method described in supplementary note 17, in which: a standby candidate wireless channel is configurable for the standby wireless link instead of the standby wireless channel;

in the comparing step, a second relative value of a third available bandwidth of the standby candidate wireless channel relative to the second available bandwidth is calculated, the third available bandwidth having been corrected in the correcting step; and in the selecting step, the standby candidate wireless channel is configured for the standby wireless link, in a case where a summation value of the second relative value in a predetermined period is greater than a second threshold.

With the above method, the same example advantage that is produced by supplementary notes 6 and 12 is produced.

[Additional Remark 3]

Some or all of the foregoing example embodiments can further be expressed as follows.

A communication system including at least one processor, the at least one processor carrying out: an acquiring process (S1) for acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link; a calculating process (S2) for calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link; a correcting process (S3) for correcting the communication-time performance parameter in accordance with a bandwidth which is identified with use of the degree of interference and which is receiving interference; and a selecting process (S4) for selecting a wireless link to be used for communication from among the first wireless link and the second wireless link, in accordance with the communication-time performance parameter corrected.

Note that this communication system may further include a memory. This memory may store a program for causing the processor to carry out the acquiring process, the calculating process, the correcting process, and the selecting process. This program may be stored in a computer-readable, non-transitory, and tangible storage medium.

REFERENCE SIGNS LIST

1: Application system
10: Communication apparatus
11: Radio section
12: Channel sensing section
20: Control section
21: Acquiring section (acquiring means)
22: Comparing section (comparing means)
23: Selecting section (selecting means)
24: Handover controlling section (selecting means)
25: Storing section
26: Calculating section (calculating means)
27: Correcting section (correcting means)
100: Communication system

What is claimed is:

1. A communication system comprising
at least one processor, the at least one processor carrying out:
a process (a) of acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link;
a process (b) of calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link;
a process (c) of correcting the communication-time performance parameter in accordance with a bandwidth which is identified with use of the degree of interference and which is receiving interference; and
a process (d) of selecting a wireless link to be used for communication from among the first wireless link and the second wireless link, in accordance with the communication-time performance parameter corrected.

2. The communication system according to claim 1, wherein:
the first wireless link is an active wireless link used for wireless communication, and the second wireless link is a standby wireless link which is kept on standby until being used for the wireless communication instead of the active wireless link; and in the process (c), the at least one processor corrects the communication-time performance parameter of the standby wireless link in accordance with a bandwidth of a standby wireless channel, the bandwidth receiving interference from an active wireless channel during communication conducted with use of the active wireless link, the standby wireless channel being a wireless channel configured for the standby wireless link, the active wireless channel being a wireless channel configured for the active wireless link.

3. The communication system according to claim 2, wherein:
the communication-time performance parameter and the non-communication-time performance parameter include a degree of congestion of each of the active wireless channel configured for the active wireless link and the standby wireless channel configured for the standby wireless link;
in the process (a), the at least one processor acquires a communication-time degree of congestion of the standby wireless channel in a case where communication via the active wireless link is being conducted and acquires a non-communication-time degree of congestion of the standby wireless channel in a case where communication via the active wireless link is not being conducted;
in the process (b), the at least one processor calculates a difference between the communication-time degree of congestion and the non-communication-time degree of congestion, with the difference being the degree of interference of the standby wireless link; and
in the process (c), the at least one processor corrects the communication-time degree of congestion of the standby wireless link by performing a subtraction based on the difference from the communication-time degree of congestion.

4. The communication system according to claim 3, wherein:
the communication-time performance parameter and the non-communication-time performance parameter further include an available bandwidth of each of the active wireless channel configured for the active wireless link and the standby wireless channel configured for the standby wireless link;
in the process (c), the at least one processor corrects the available bandwidth of the standby wireless channel by adding a bandwidth which is identified in accordance with the difference and which is receiving interference, to the available bandwidth; and
in the process (d), the at least one processor determines whether to switch the standby wireless link such that the standby wireless link serves as the active wireless link, in accordance with the available bandwidth corrected.

5. The communication system according to claim 4, wherein
the at least one processor further carries out a process of calculating a first relative value of a second available bandwidth of the standby wireless channel relative to a first available bandwidth of the active wireless channel, the second available bandwidth having been corrected,
in the process (d), the at least one processor switches the standby wireless link such that the standby wireless link serves as the active wireless link, in a case where the first relative value is greater than a first threshold.

6. The communication system according to claim 5, wherein:

a standby candidate wireless channel is configurable for the standby wireless link instead of the standby wireless channel;
in the process of calculating the first relative value, the at least one processor calculates a second relative value of a third available bandwidth of the standby candidate wireless channel relative to the second available bandwidth, the third available bandwidth having been; corrected; and
in the process (d), the at least one processor configures the standby candidate wireless channel for the standby wireless link, in a case where a summation value of the second relative value in a predetermined period is greater than a second threshold.

7. A communication apparatus comprising
at least one processor, the at least one processor carrying out:
a process (a) of acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link;
a process (b) of calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link;
a process (c) of correcting the communication-time performance parameter in accordance with a bandwidth which is identified with use of the degree of interference and which is receiving interference; and
a process (d) of selecting a wireless link to be used for communication from among the first wireless link and the second wireless link, in accordance with the communication-time performance parameter corrected.

8. The communication apparatus according to claim 7, wherein:
the first wireless link is an active wireless link used for wireless communication, and the second wireless link is a standby wireless link which is kept on standby until being used for the wireless communication instead of the active wireless link; and
in the process (c), the at least one processor corrects the communication-time performance parameter of the standby wireless link in accordance with a bandwidth of a standby wireless channel, the bandwidth receiving interference from an active wireless channel during communication conducted with use of the active wireless link, the standby wireless channel being a wireless channel configured for the standby wireless link, the active wireless channel being a wireless channel configured for the active wireless link.

9. The communication apparatus according to claim 8, wherein:
- the communication-time performance parameter and the non-communication-time performance parameter include a degree of congestion of each of the active wireless channel configured for the active wireless link and the standby wireless channel configured for the standby wireless link;
- in the process (a), the at least one processor acquires a communication-time degree of congestion of the standby wireless channel in a case where communication via the active wireless link is being conducted and acquires a non-communication-time degree of congestion of the standby wireless channel in a case where communication via the active wireless link is not being conducted;
- in the process (b), the at least one processor calculates a difference between the communication-time degree of congestion and the non-communication-time degree of congestion, with the difference being the degree of interference of the standby wireless link; and
- in the process (c), the at least one processor corrects the communication-time degree of congestion of the standby wireless link by performing a subtraction based on the difference from the communication-time degree of congestion.

10. The communication apparatus according to claim 9, wherein:
- the communication-time performance parameter and the non-communication-time performance parameter further include an available bandwidth of each of the active wireless channel configured for the active wireless link and the standby wireless channel configured for the standby wireless link;
- in the process (c), the at least one processor corrects the available bandwidth of the standby wireless channel by adding a bandwidth which is identified in accordance with the difference and which is receiving interference, to the available bandwidth; and
- in the process (d), the at least one processor determines whether to switch the standby wireless link such that the standby wireless link serves as the active wireless link, in accordance with the available bandwidth corrected.

11. The communication apparatus according to claim 10, wherein
- the at least one processor further carries out a process of calculating a first relative value of a second available bandwidth of the standby wireless channel relative to a first available bandwidth of the active wireless channel, the second available bandwidth having been corrected,
- in the process (d), the at least one processor switches the standby wireless link such that the standby wireless link serves as the active wireless link, in a case where the first relative value is greater than a first threshold.

12. The communication apparatus according to claim 11, wherein:
- a standby candidate wireless channel is configurable for the standby wireless link instead of the standby wireless channel;
- in the process of calculating the first relative value, the at least one processor calculates a second relative value of a third available bandwidth of the standby candidate wireless channel relative to the second available bandwidth, the third available bandwidth having been corrected; and
- in the process (d), the at least one processor configures the standby candidate wireless channel for the standby wireless link, in a case where a summation value of the second relative value in a predetermined period is greater than a second threshold.

13. A wireless link selection method comprising:
- acquiring a communication-time performance parameter and a non-communication-time performance parameter for each of a first wireless link and a second wireless link, the communication-time performance parameter representing a wireless link communication performance which is indicated in a case where a communication apparatus is conducting wireless communication, the non-communication-time performance parameter representing a wireless link communication performance which is indicated in a case where the communication apparatus is not conducting wireless communication, the communication apparatus conducting wireless communication with use of at least one selected from the group consisting of the first wireless link and the second wireless link;
- calculating a degree of interference in accordance with the communication-time performance parameter and the non-communication-time performance parameter of the second wireless link, the degree of interference representing a degree to which a second wireless channel configured for the second wireless link receives interference during wireless communication conducted with use of the first wireless link, from a first wireless channel configured for the first wireless link;
- correcting the communication-time performance parameter in accordance with a bandwidth which is identified with use of the degree of interference and which is receiving interference; and
- selecting a wireless link to be used for communication from among the first wireless link and the second wireless link, in accordance with the communication-time performance parameter corrected.

14. The wireless link selection method according to claim 13, wherein:
- the first wireless link is an active wireless link used for wireless communication, and the second wireless link is a standby wireless link which is kept on standby until being used for the wireless communication instead of the active wireless link; and
- in the correcting, the communication-time performance parameter of the standby wireless link is corrected in accordance with a bandwidth of a standby wireless channel, the bandwidth receiving interference from an active wireless channel during communication conducted with use of the active wireless link, the standby wireless channel being a wireless channel configured for the standby wireless link, the active wireless channel being a wireless channel configured for the active wireless link.

15. The wireless link selection method according to claim 14, wherein:
- the communication-time performance parameter and the non-communication-time performance parameter include a degree of congestion of each of the active wireless channel configured for the active wireless link and the standby wireless channel configured for the standby wireless link;
- in the acquiring, a communication-time degree of congestion of the standby wireless channel is acquired in a case where communication via the active wireless link is being conducted, and a non-communication-time degree of congestion of the standby wireless channel is acquired in a case where communication via the active wireless link is not being conducted;

in the calculating, a difference between the communication-time degree of congestion and the non-communication-time degree of congestion is calculated, with the difference being the degree of interference of the standby wireless link; and in the correcting, the communication-time degree of congestion of the standby wireless link is corrected by performing a subtraction based on the difference from the communication-time degree of congestion.

16. The wireless link selection method according to claim 15, wherein:

the communication-time performance parameter and the non-communication-time performance parameter further include an available bandwidth of each of the active wireless channel configured for the active wireless link and the standby wireless channel configured for the standby wireless link;

in the correcting, an available bandwidth of the standby wireless channel is corrected by adding the bandwidth which is identified in accordance with the difference and which is receiving interference, to the available bandwidth; and in the selecting, whether to switch the standby wireless link such that the standby wireless link serves as the active wireless link is determined in accordance with the available bandwidth corrected.

17. The wireless link selection method according to claim 16, further comprising calculating a first relative value of a second available bandwidth of the standby wireless channel relative to a first available bandwidth of the active wireless channel, the second available bandwidth having been corrected, in the selecting, the standby wireless link being switched such that the standby wireless link serves as the active wireless link, in a case where the first relative value is greater than a first threshold.

18. The wireless link selection method according to claim 17, wherein:

a standby candidate wireless channel is configurable for the standby wireless link instead of the standby wireless channel;

in the calculating of the first relative value, a second relative value of a third available bandwidth of the standby candidate wireless channel relative to the second available bandwidth is calculated, the third available bandwidth having been; corrected; and in the selecting, the standby candidate wireless channel is configured for the standby wireless link, in a case where a summation value of the second relative value in a predetermined period is greater than a second threshold.

* * * * *